United States Patent

Kosugi et al.

[11] Patent Number: 6,050,717
[45] Date of Patent: *Apr. 18, 2000

[54] HEAD-MOUNTED IMAGE DISPLAY HAVING SELECTIVE IMAGE SUSPENSION CONTROL AND LIGHT ADJUSTMENT

[75] Inventors: Ichiro Kosugi, Tokyo; Daiji Takahashi, Kanagawa; Yoshio Okoshi, Kanagawa; Akira Ogihara, Kanagawa; Atsushi Koide, Tokyo; Isao Sawachika, Kanagawa, all of Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/853,884

[22] Filed: May 9, 1997

[30] Foreign Application Priority Data

May 15, 1996 [JP] Japan ................................. 8-120096
May 15, 1996 [JP] Japan ................................. 8-120643

[51] Int. Cl.[7] ................................................ G05B 19/00
[52] U.S. Cl. ........................................ 364/146; 345/214
[58] Field of Search ................................. 349/16, 13, 33, 349/37, 193, 11; 364/146; 345/7, 8

[56] References Cited

U.S. PATENT DOCUMENTS 5,579,026  11/1996  Tabata ............................................. 345/8
5,583,674  12/1996  Mosley .......................................... 349/77
5,841,466  11/1998  Mizoguchi, et al. ......................... 348/5.5

*Primary Examiner*—William Grant
*Assistant Examiner*—Peter W. Eissmann
*Attorney, Agent, or Firm*—Rader, Fishman & Grauer; Ronald P. Kananen

[57] ABSTRACT

An optical visualizing apparatus for use in a head mounted display unit contains a liquid crystal shutter designed to allow a viewer to see both an image display and scenery outside of the image display at the same time. The apparatus contains a screen placed in front of the viewer's eyes, an optical visualizing unit to display an image on the screen, a mounting unit for supporting the optical visualizing unit in front of the viewer's face, and a control unit that can either suspend transmission of the image and allow clear sighting through the screen without the image or, if desired, simultaneous display of the image and sighting of scenery outside of the image. The control unit preferably controls a liquid crystal shutter that can adjust the amount of external light entering the display apparatus over two ranges, one range corresponding to the image area and the other range corresponding to the area surrounding the image area, so that the user can view a displayed image and external scenery clearly and simultaneously.

13 Claims, 26 Drawing Sheets

| FIG. 6A | FIG. 6B |

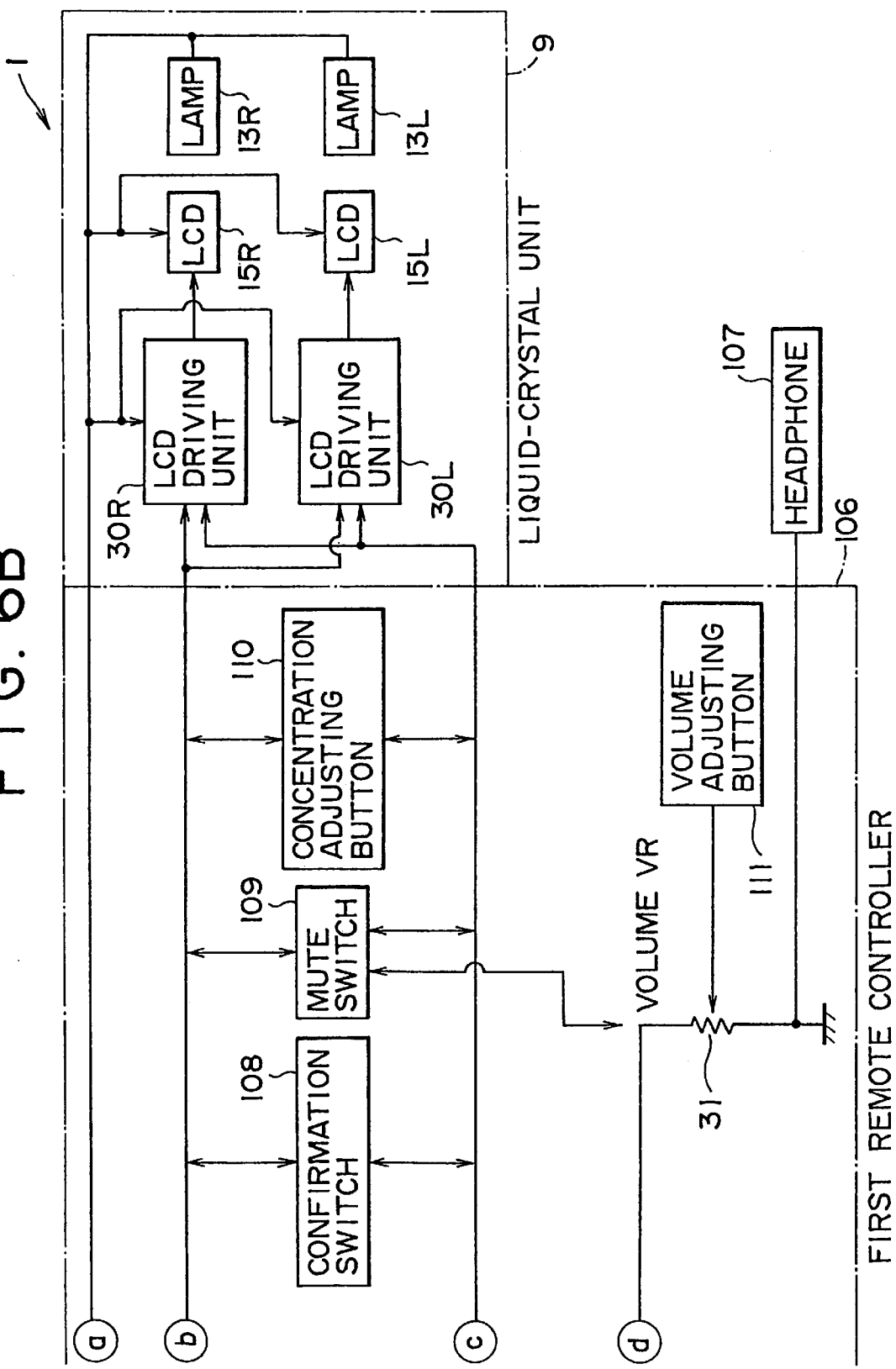

A TIME LONGER THAN FOUR HOURS HAS LAPSED.
IF YOU ARE TIRED, PLEASE TAKE A REST.

PLEASE PRESS THE CONFIRMATION SWITCH
TO CONTINUE TO THE NEXT SCREEN.

WARNING!
A TIME OF SIX HOURS HAS LAPSED.
FOR THE SAKE OF YOUR HEALTH,
PLEASE STOP WATCHING IMAGES SINCE
IT IS FEARED THAT FURTHER USE OF
THE APPARATUS WILL HARM YOUR HEALTH.
THE POWER SUPPLY WILL BE TURNED OFF
IN A SHORT TIME.

VOD CONSTANT AMPLITUDE

AMPLITUDE OF AMP1 OUTPUT

AMPLITUDE OF AMP2 OUTPUT FOR $\alpha = 1$

AMPLITUDE OF AMP2 OUTPUT FOR $\alpha = 1/2$

HEAD-MOUNTED IMAGE DISPLAY HAVING SELECTIVE IMAGE SUSPENSION CONTROL AND LIGHT ADJUSTMENT

BACKGROUND OF THE INVENTION

1. Field of the Invention

The present invention relates in general to an optical visualizing apparatus, and in particular to an optical visualizing apparatus such as an HMD (head mounted display) apparatus mounted in front of a viewer's face for viewing an image.

2. Description of the Related Art

In the related art, there has been proposed a typical optical visualizing apparatus for viewing images, such as video or television images, that are displayed on a pair of color liquid-crystal display panels mounted in front of the is face of the viewer and that are enlarged by means of an ocular lens.

A display unit for this type of optical visualizing apparatus comprises components embedded in a cabinet-like lens barrel. The components include a backlight, a transmitting-type liquid-crystal display device illuminated by the backlight and a reflecting mirror for reflecting an image output to the liquid-crystal display device to ocular lenses. An image output to the liquid-crystal display device is enlarged by the ocular lenses before being projected on the retinas of the right and left eyes of the image viewer.

Such an optical visualizing apparatus may be mounted on the head of the viewer or can be worn in the same way as spectacles.

However, external scenery can not be seen by a user wearing such an optical visualizing apparatus because the optical visualizing apparatus outputs an image directly in front of the eyes of the viewer. In order to see external scenery, a power-supply switch of the optical visualizing apparatus must be turned off or the concentration of the image must be adjusted by using an adjusting means, such as a concentration adjusting button.

FIG. 3 is a diagram showing an optical visualizing unit 4 employed in an optical visualizing apparatus provided by the related art. As shown in the figure, in the optical visualizing unit 4, typically an image illuminated by a light-source unit 12 serving as a light source of the liquid-crystal display device is reflected by a concave half mirror 19 to be seen as a virtual image. The outer surface of the concave half mirror 19 completes a transmitting-type half coating process. On the outer side of the concave half mirror 19, a liquid-crystal shutter 23 is provided for adjusting infiltration by beams coming from the external world.

FIG. 29 is a diagram showing the liquid-crystal shutter 23. As shown in the figure, the liquid-crystal shutter 23 is formed into a shape resembling spectacles. The spectacles portion is made of a liquid crystal 26a that is connected to a flexible connector 27 by a transparent electrode.

When the viewer wishes to see external scenery while he or she is viewing an image in the optical visualizing unit 4 equipped with such a liquid-crystal shutter 23, light coming from outside the apparatus is allowed to infiltrate into the optical visualizing unit 4 by adjusting the concentration of an image being viewed. While the concentration of the image is being adjusted, the entire liquid crystal of the liquid-crystal shutter is set to an opened state.

However, the optical visualizing apparatus of the related art has a problem that, when a suspending operation such as a mute operation is carried out, only the sound disappears but the image remains displayed or, even if both the sound and the image disappear, the external scenery can not be observed unless other operations are performed. In addition, there also arises another problem that while the image viewer is seeing the external scenery, the external scenery is inadvertently interrupted because the video and audio signals are still output to the viewer.

As a result, a problem which remains to be solved exists in how to process the image and the sound and how to control the state of the image after a suspend operation, such as a mute operation, has been carried out.

Also, the optical visualizing apparatus provided by the related art as described above also has a problem that, when the concentration of an image is adjusted, too much outside light enters the optical visualizing apparatus, providing too much interference to the image being viewed because the liquid-crystal shutter 23 for shielding the light coming from outside the apparatus has the same spectacles-like shape and the same size as the concave half mirror.

SUMMARY OF THE INVENTION

It is thus an object of the present invention to provide an optical visualizing apparatus wherein the structure of a liquid-crystal shutter thereof is so designed and the liquid-crystal shutter is controlled such that, when the viewer sees the external scenery while viewing the image, interference by outside light is not experienced or, even if experienced, the image can be seen clearly and the external scenery is also visible as well.

In order to solve the problems described above, the present invention is an optical visualizing apparatus including:

a control unit that suspends the display of the image and puts the screen in a translucent or transparent state when the mute operation is carried out.

With the configuration described above, when a mute operation is carried out, the image and the sound are suspended and the screen is put in a translucent or transparent state, preventing complete visual blockage in front of the eyes of the image viewer.

The optical visualizing apparatus provided by the present invention includes:

a liquid-crystal shutter provided on the outer side of a concave half mirror for adjusting the amount of outside infiltrating light, wherein the liquid-crystal shutter has an adjustment means for adjusting the amount of the light by dividing an area for light adjustment into a range corresponding to the display region of an image reflected by the concave half mirror and a range surrounding the display region.

In addition, in the optical visualizing apparatus, the liquid-crystal shutter includes first and second liquid-crystal boards driven by a power-supply voltage and a signal obtained by inverting the amplitude of the power-supply voltage supplied to the first or second liquid-crystal board is supplied as a common signal.

Since the configuration described above adjusts amount of light infiltrating the optical visualizing unit by splitting the area of light adjustment into two or more ranges and shields only light infiltrating a predetermined range such as, for example, the range used to an image, the image viewer can see external scenery while still viewing a bright image.

In addition, by supplying a signal obtained by inverting the amplitude of a power-supply voltage used in the liquid-crystal shutter as a common signal, the first or second liquid-crystal board can be driven by half the amplitude of the power-supply voltage.

BRIEF DESCRIPTION OF THE DRAWINGS

FIG. 19 is a screen for use by the viewer to enter and verify a

DETAILED DESCRIPTION OF THE PREFERRED EMBODIMENTS

The present invention will become more apparent from a study of the following detailed description of a HMD (head mounted display) apparatus 1 and an optical visualizing apparatus provided by the present embodiment, with reference to accompanying diagrams.

Figure 1:
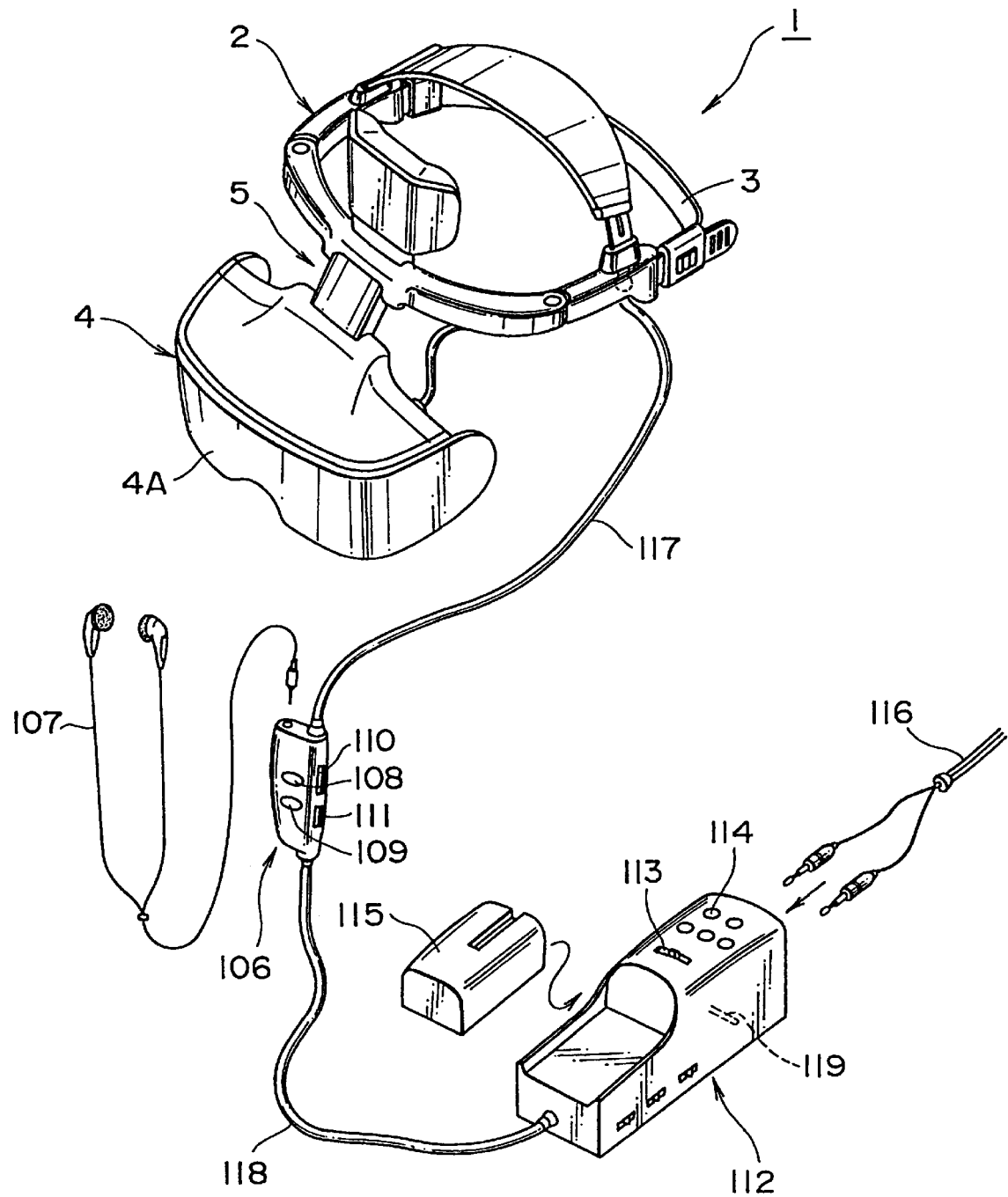
FIG. 1 is a diagram showing a perspective view of the entire optical visualization apparatus provided by an embodiment of the present invention.
Figures 6, 6A:
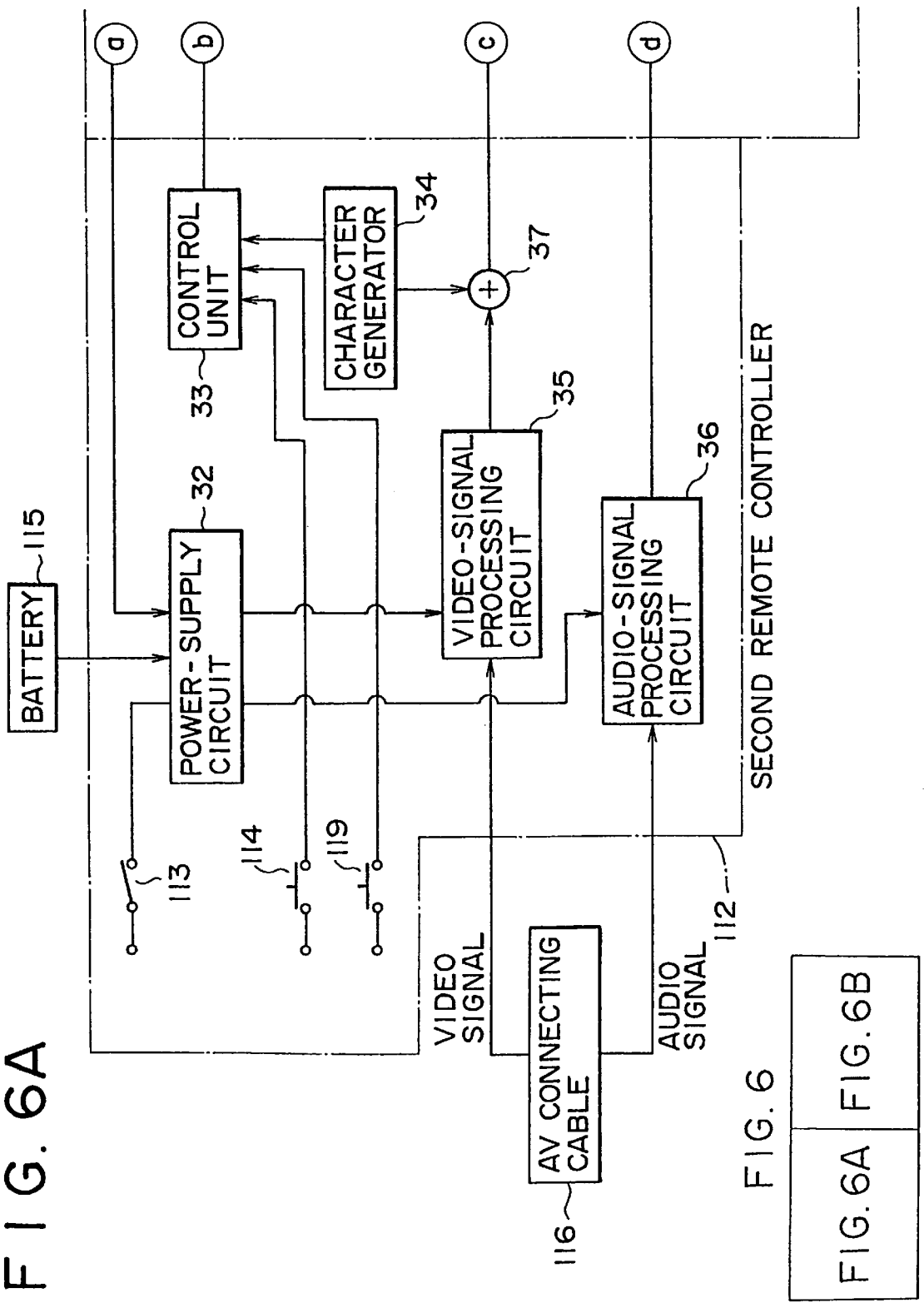
FIG. 6 is a circuit block diagram showing the optical visualizing apparatus.

FIG. 1 is a diagram showing the HMD apparatus 1. As shown in the figure, the HMD apparatus 1 comprises an optical visualizing apparatus body 2, a first remote controller 106 connected to the optical visualizing apparatus body 2 by a first connecting cord 117 and a second remote controller 112 connected to the first remote controller 106 by a second connecting cord 118. FIG. 6 is a diagram illustrating the electrical connection of these components.

The optical visualizing apparatus body 2 comprises a head mount unit 3 for mounting the optical visualizing apparatus 1 and an optical visualizing unit 4 which is connected to the head mount unit 3 by a linking unit 5. The head mount unit 3 is designed to be wearable on the head of the viewer, leaving the viewer's hands free. When the head mount unit 3 worn is on the head of the viewer, the optical visualizing unit 4 is positioned in front of the viewer's face.

Figure 2:
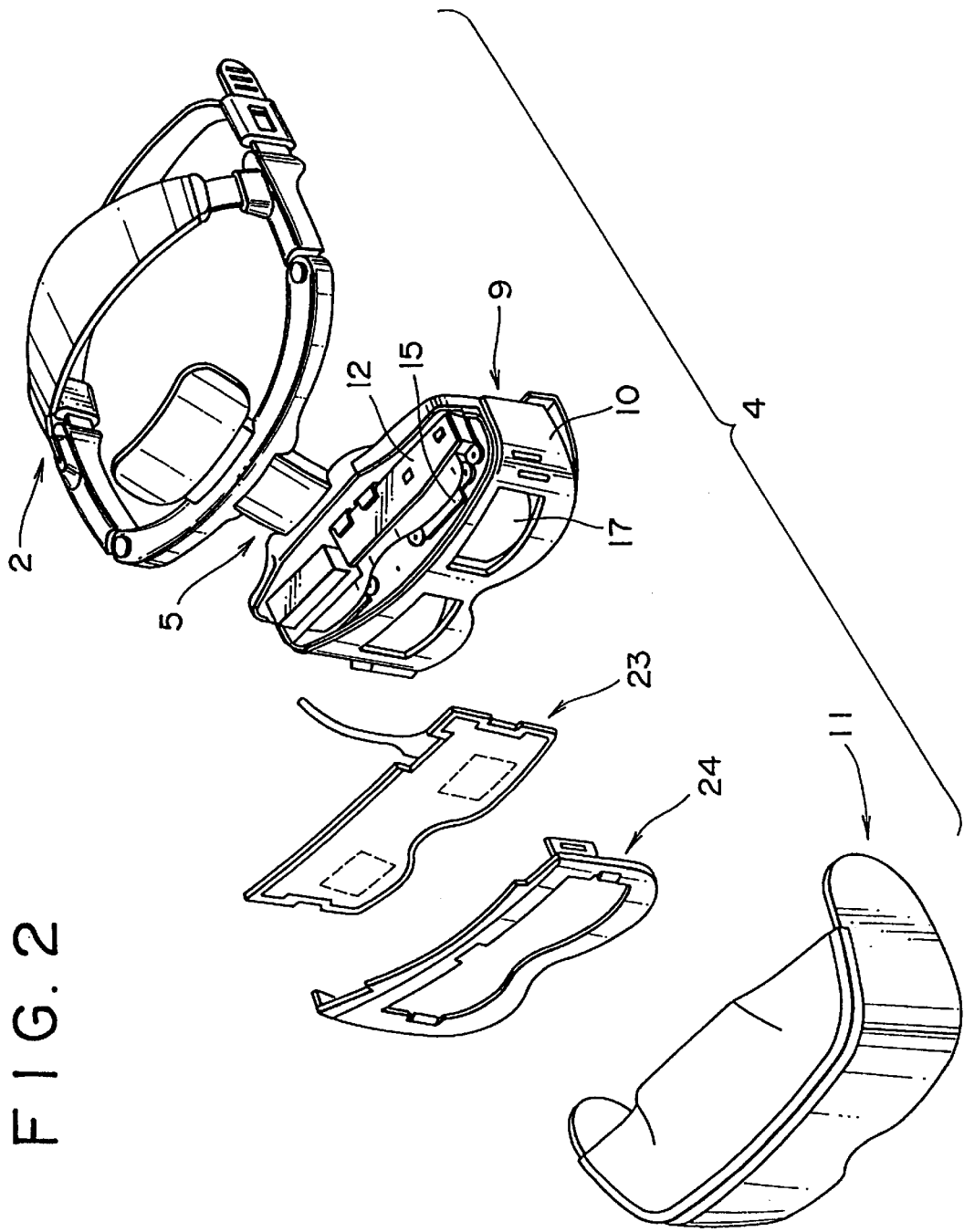
FIG. 2 is a diagram roughly showing an exploded perspective view of a liquid-crystal display unit employed in the optical visualization apparatus.

FIG. 2 is an exploded view of the optical visualizing unit 4. As shown in the figure, the optical visualizing unit 4 comprises a cabinet 10 with a shape resembling a pair of goggles for accommodating a liquid-crystal display unit 9 from the top, a liquid-crystal shutter 23 provided in front of the cabinet 10 for adjusting the amount of outside light reaching the inside of the liquid-crystal display unit 9, a liquid-crystal-shutter supporting unit 24 provided on the front surface of the liquid-crystal display unit 9 for supporting the liquid-crystal shutter 23 and a front-surface covering unit 11 having a shape resembling a pair of goggles for concealing the front surface of the entire cabinet 10. The cabinet 10 is connected to the link unit 5 in such a way that the cabinet 10 can be adjusted up and down.

The liquid-crystal display unit 9 comprises a light source unit 12 provided near the top of the display unit 9, a liquid-crystal display device 15 for generating beams forming an image from a light received from the light source unit 12, and a lens block 17 for generating a virtual image by enlarging the image generated by the liquid-crystal display device 15 via light beam refraction.

Figure 3:
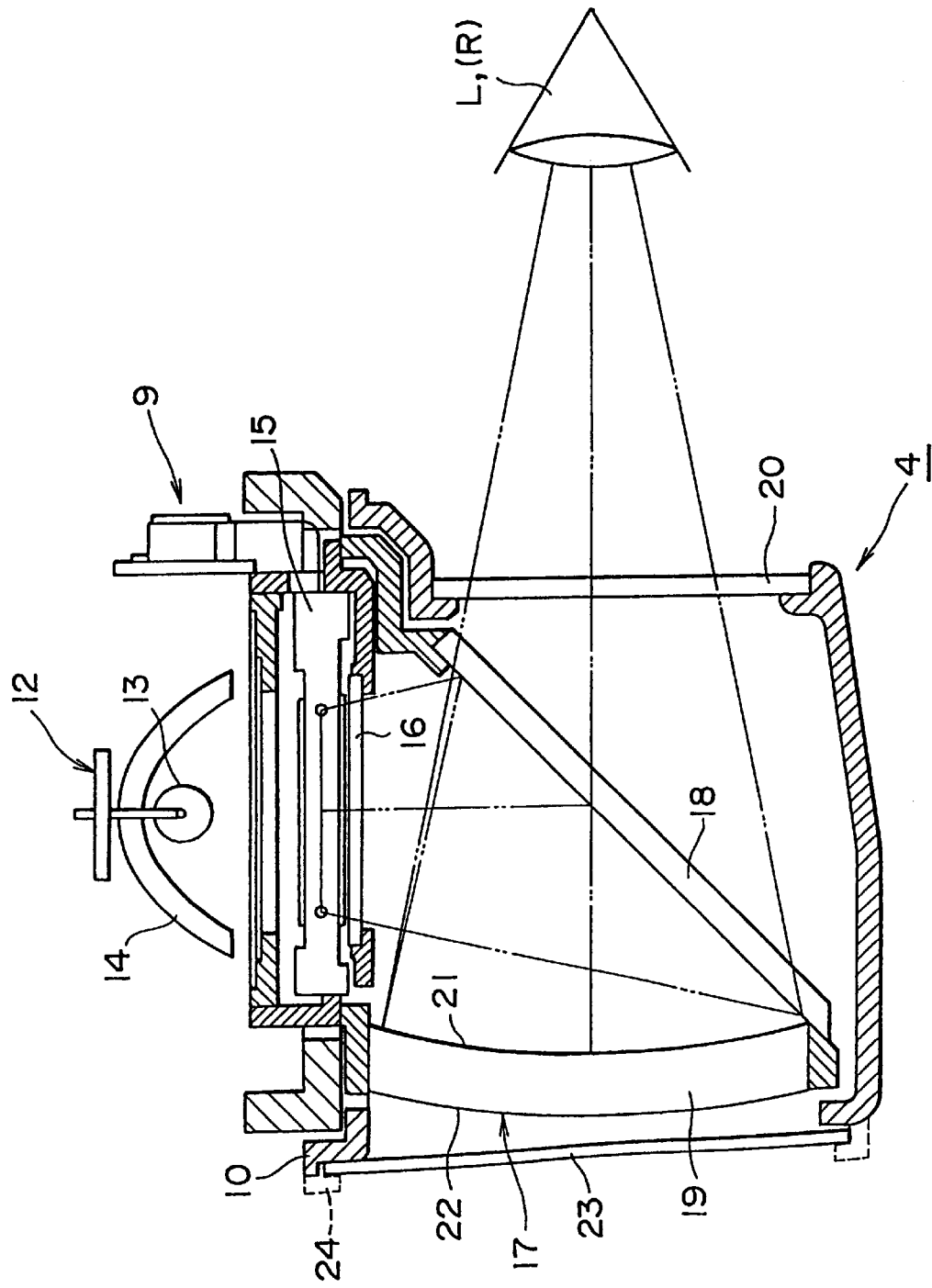
FIG. 3 is a diagram showing a cross section of the liquid-crystal display unit employed in the optical visualization apparatus of the prior related art.

FIG. 3 is a diagram showing a cross-section of the liquid-crystal display unit 9. As shown in the figure, the light-source unit 12 comprises a fluorescent lamp serving as light-source 13 and a reflector 14 having a hemispherical shape for converging beams coming from the light source 13 and reflecting the converged beam in the downward direction.

As shown in FIG. 3, the liquid-crystal display device 15 is disposed below the light-source unit 12. The liquid-crystal display device 15 receives beams coming from the light-source 13 employed in the light-source unit 12, supplying beams generating an image in the downward direction. A side of the liquid-crystal display device 15 that generates the image beam is covered by a liquid-crystal cover 16.

As shown in FIG. 3, the lens block 17 comprises a half mirror 18, which is disposed at an angle of about 45 degrees with the liquid-crystal display device 15, a concave half mirror 19 disposed on the outer side of the liquid-crystal display unit 9 perpendicular to the liquid-crystal display device 15 for reflecting beams of an image and peep windows 20 provided at locations allowing the viewers eyes L and R to be positioned on the side of the liquid-crystal display unit 15 opposite the concave half mirror 19. The peep windows 20 are provided at locations facing the concave half mirror 19.

One surface of the half mirror 18, which receives beams of an image coming from the liquid-crystal display device 15, is formed into a plane shape completing a half- coating fabrication process.

The concave half mirror 19 faces the eyeballs L and R of the viewer. The surface on the inner side of the concave half mirror 19 is a reflecting surface 21 while the surface on the outer side thereof is a half coating surface 22 coated with a coating material that transmits light.

As shown in FIG. 3, the liquid-crystal shutter 23 is attached to the front face of the cabinet 10, which accommodates the liquid-crystal display unit 9, by the liquid-crystal shutter supporting units 24. The liquid-crystal shutter 23 is built so that infiltration of outside light into the optical visualizing unit 4 can be adjusted thereby with perfect freedom.

Figure 4A:
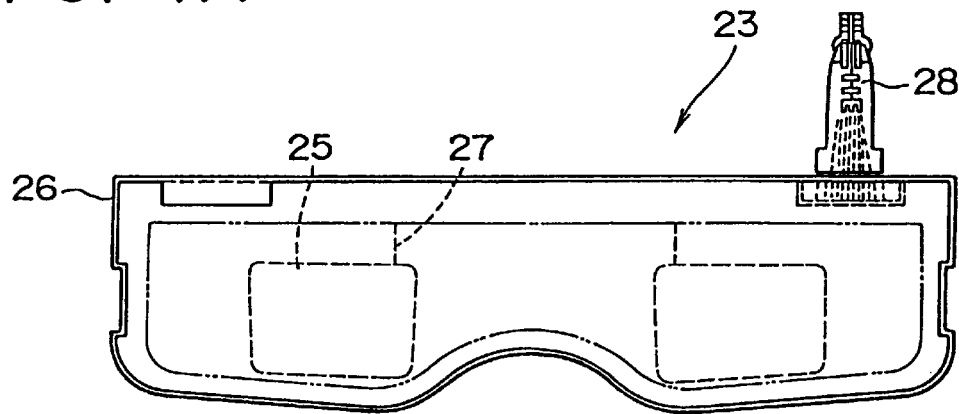
FIGS. 4A to 4C are plan diagrams showing the structure of a liquid-crystal shutter employed in the optical visualization apparatuse.
Figure 4B:
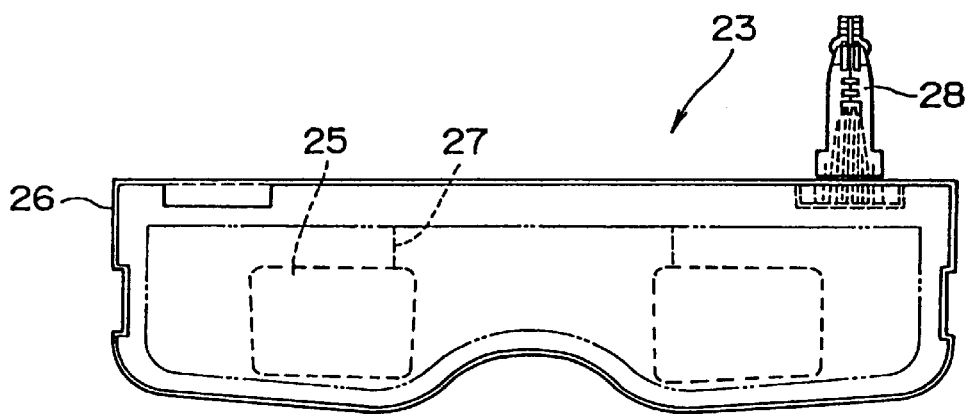
Figure 4C:
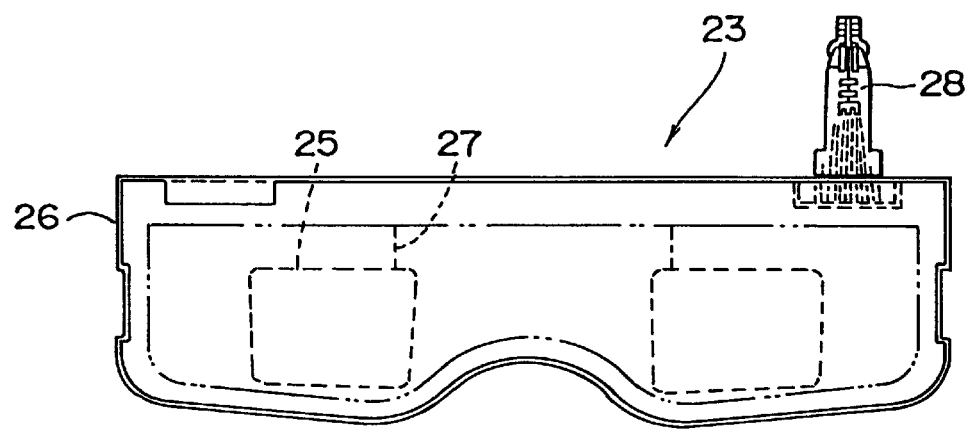

FIGS. 4A to 4C are plan views of the liquid-crystal shutter 23. As shown in FIG. 4A, the liquid-crystal shutter 23 is created from stacked layers comprising two pieces of liquid-crystal, thin-board members having a shape resembling spectacles, and wiring members between the two pieces of liquid-crystal thin-board members. On the front-surface of the liquid-crystal shutter 23, there are two first liquid-crystal boards 25, each made of a liquid crystal having a square shape. The area of the liquid crystal is slightly larger than the area of a liquid-crystal display range of beams passing through the concave half mirror 19. On the back-surface of the liquid-crystal shutter 23, there is a second liquid-crystal board 26, which is a semi-transparent member also made of a liquid crystal. The second liquid-crystal board 26 has a spectacle-like shape and covers all but the back surface of the liquid-crystal shutter 23. There is also provided a power-supply sheet 27, which is a conductive member made of transparent films placed between the first liquid-crystal boards 25 and the second liquid-crystal board 26. The power-supply sheet 27 is connected to a flexible connector 28. The first liquid-crystal boards 25, the second liquid-crystal board 26, the power-supply sheet 27 and the flexible connector 28 described above form the liquid-crystal shutter 23 assembly.

As shown in FIG. 4B, the first liquid-crystal boards 25 are provided at the right and left sides of the liquid-crystal shutter 23 symmetrically with respect to the vertical center line of the liquid-crystal shutter 23, forming a shape resembling spectacles. The liquid-crystal portion of the liquid-crystal board 25 has a square shape with an area equal to an area over which beams of an image reflected by the concave half mirror 19 shown in FIG. 3 are transmitted. By changing the optical transmittance of the liquid-crystal portion, the liquid-crystal portion is turned on and off so that the amount of outside light entering through the liquid crystal can be adjusted.

As shown in FIG. 4C, the second liquid-crystal board 26 has a shape resembling spectacles with the entire plane thereof made of a liquid-crystal member. The liquid-crystal board 26 is designed so that the amount of outside light coming through the liquid-crystal portion thereof can be adjusted.

Figure 5A:
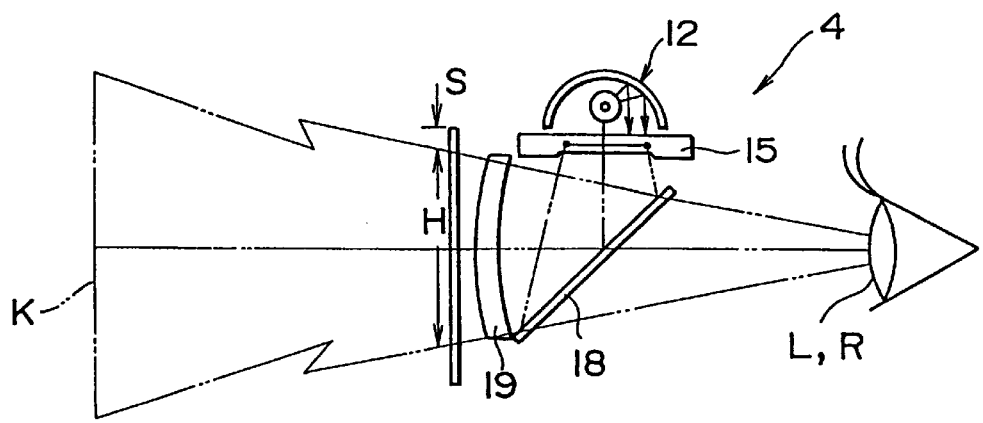
FIGS. 5A and 5B are cross-sectional diagrams illustrating optical paths in the liquid-crystal display unit.
Figure 5B:
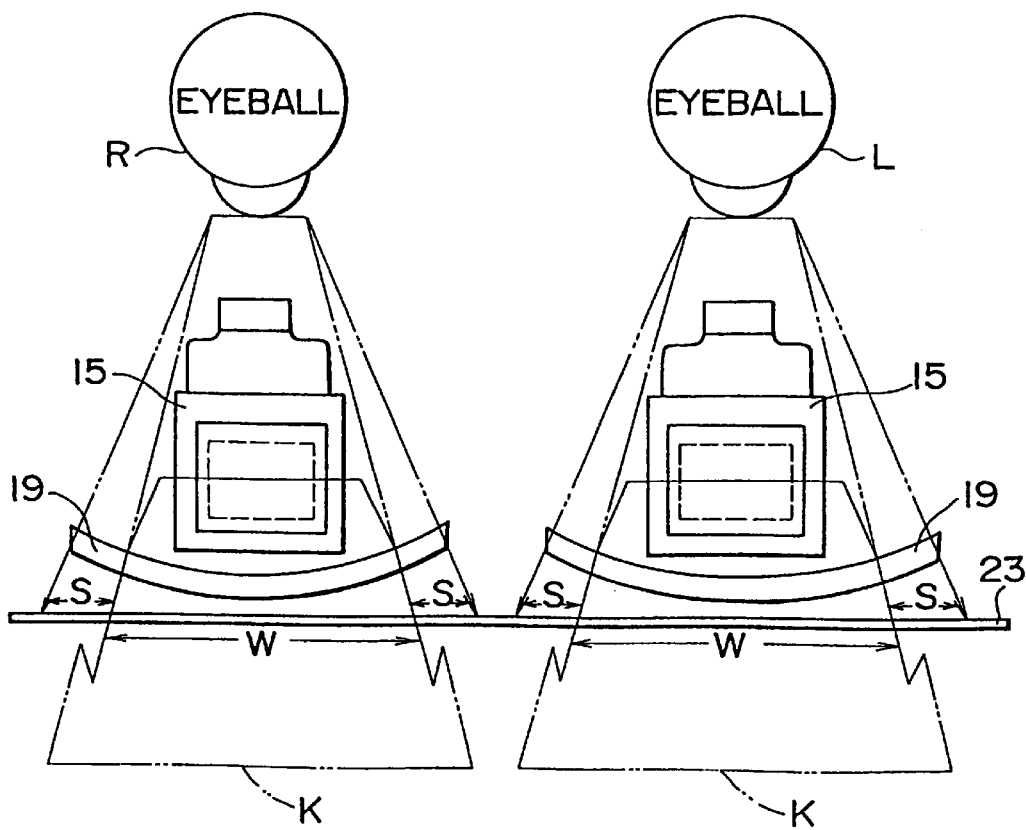

FIGS. 5A and 5B are cross-sectional diagrams illustrating approximate showing optical paths in the liquid-crystal display unit. As shown in FIG. 5A, an image in the liquid-crystal device 15 of the inventive optical visualizing apparatus 4 is formed by illuminating the back surface of the liquid-crystal device 15 using the light source of the light-source unit 12. The half mirror 18 changes optical path direction of the image beams generated by the liquid-crystal device 15 toward the concave half mirror 19.

The image beams directed toward the concave half mirror 19 are reflected by the reflective surface thereof. The beams of the image then propagate to the eyeballs R and L of the image viewer, allowing an enlarged virtual image K to be seen by the viewer.

In the liquid-crystal shutter 23, light coming from outside the optical visualizing apparatus can be divided into a square image display range H/W with a height H and a width W for displaying an image and a range S surrounding the square image display range H/W, which is within the user's field of vision but outside the square image display range H/W. The first crystal-display board 25 has a structure that includes a liquid-crystal member having a square shape. The area of the square liquid-crystal member is slightly larger than the area of the square image display range H/W having the height H and the width W. Even when the liquid-crystal shutter 23 is put in a translucent or transparent state in which outside light can pass through the second liquid-crystal board 26 into the inside of the optical visualizing unit 4, the liquid-crystal member in the first liquid-crystal board 25 can be set to a closed state, blocking outside light. In this state, while viewing an image clearly with little interference, a viewer can also see external scenery at the same time.

In this way, the image display range H/W with height H, width W, and range S surrounding the image display range H/W can be controlled independently of each other or simultaneously to adjust the amount of outside light infiltrating the inside of the optical visualizing unit 4.

As shown in FIG. 1, the first remote controller 106 is placed approximately in the center between the first and second connecting cords 117 and 118. This position allows the first remote controller 106 to be operated easily by the user. The first remote controller 106 is connected to earphones 107, which can be attached to the ears of the viewer without hindering free movement. The first remote controller 106 has a confirmation switch 108 for requesting a continuation operation, a mute switch 109 for switching the optical visualizing unit 23 from a normal imaging state to see-through state, in which external scenery is visible through the display and vice versa, a concentration adjusting button 110 for adjusting the concentration of an image produced by the optical visualizing unit 4, and a volume adjusting button 111 for adjusting the volume of sound supplied to the earphones 107.

As shown in FIG. 6, the confirmation switch 108, the mute switch 109 and the concentration adjusting button 110 are each a control key for controlling the displays of an image in LCDS 15R and 15L of the liquid-crystal display unit 9. Control signals generated by the confirmation switch 108, the mute switch 109 and the concentration adjusting button 110 are supplied to LCD driving units 30R and 30L of the LCDs 15R and 15L respectively. The volume adjusting button 111 is used for adjusting the volume of sound supplied to the headphones (or earphones) 107 via a volume adjuster 31.

When the mute switch 109 is pressed while an image is being displayed, the optical visualizing unit 4 is switched at once to a translucent or transparent state in which external scenery is visible through the unit 4. More particularly, when the mute switch 109 is pressed while a screen is being displayed, the operation to display the image is terminated and, when video and audio signals are being output from a signal source, such as AV equipment, to the HMD apparatus 1, the signal output is terminated. When the mute switch 109 is pressed again, the optical visualizing unit 4 is restored to a operational state capable of displaying a screen. More particularly, when the display operation is terminated, the suspended screen is re-displayed and, when the video/audio output operation is ended, the operation is resumed, allowing the suspended image and sound to continue. In addition, when the mute switch 109 is pressed and then not operated for a predetermined time, say, for eight minutes, a power-supply switch 113 is turned off automatically for implementing an electric-power-saving feature.

The second remote controller 112 is preferably a desk mounted type. As shown in FIG. 1, the external configuration of the second remote controller 112 comprises the power-supply switch 113 and numeric keys 114 for entering a password. On the back side of the second remote controller 112, a reset switch 119 is provided. In addition, a battery 115 is mounted in the second remote controller 112 for supplying electrical power. Video and audio signals coming from AV equipment (not shown) are supplied to the second remote controller 112 by way of an AV connecting cable 116 connected thereto.

As shown in FIG. 6, the internal configuration of the second remote controller 112 with the external configuration described above includes:

a power-supply circuit 32 for supplying electrical power generated by the battery 115 to the fluorescent lamps 13R and 13L, the LCDs 15R and 15L of the liquid-crystal display unit 9 and to other circuits in accordance with the on-and-off position of the power-supply switch 113;

a control unit 33 for controlling LCD driving units 30R and 30L as well as the LCDS 15R and 15L of the liquid-crystal display unit 9;

a character generator 34 for generating a character signal to display characters and words;

a video-signal processing circuit 35 for processing a video signal from AV equipment, which serves as a signal generating source (not shown) via the AV connecting cable 116, and for outputting a predetermined video signal;

an audio-signal processing circuit 36 for processing an audio signal from the AV equipment via the AV connecting cable 116 and for outputting a predetermined audio signal to the volume adjuster 31 of the first remote controller 106; and an adder 37 for superimposing the character signal generated by the character generator 34 onto the video signal output by the video-signal processing circuit 35 and for outputting a signal resulting from the superimposition to the LCD driving units 30R and 30L employed in the liquid-crystal display unit 9.

The control unit 33 has "soft" functions, which will be described in more detail later, such as a function for controlling a warning screen, a function to check the display using check screens and a function to control operations to input a password and check the validity of the password.

Next, functions of the HMD apparatus 1 with the configuration described above are explained by referring to flowcharts by focusing on, in particular, the mute function.

Figure 7:
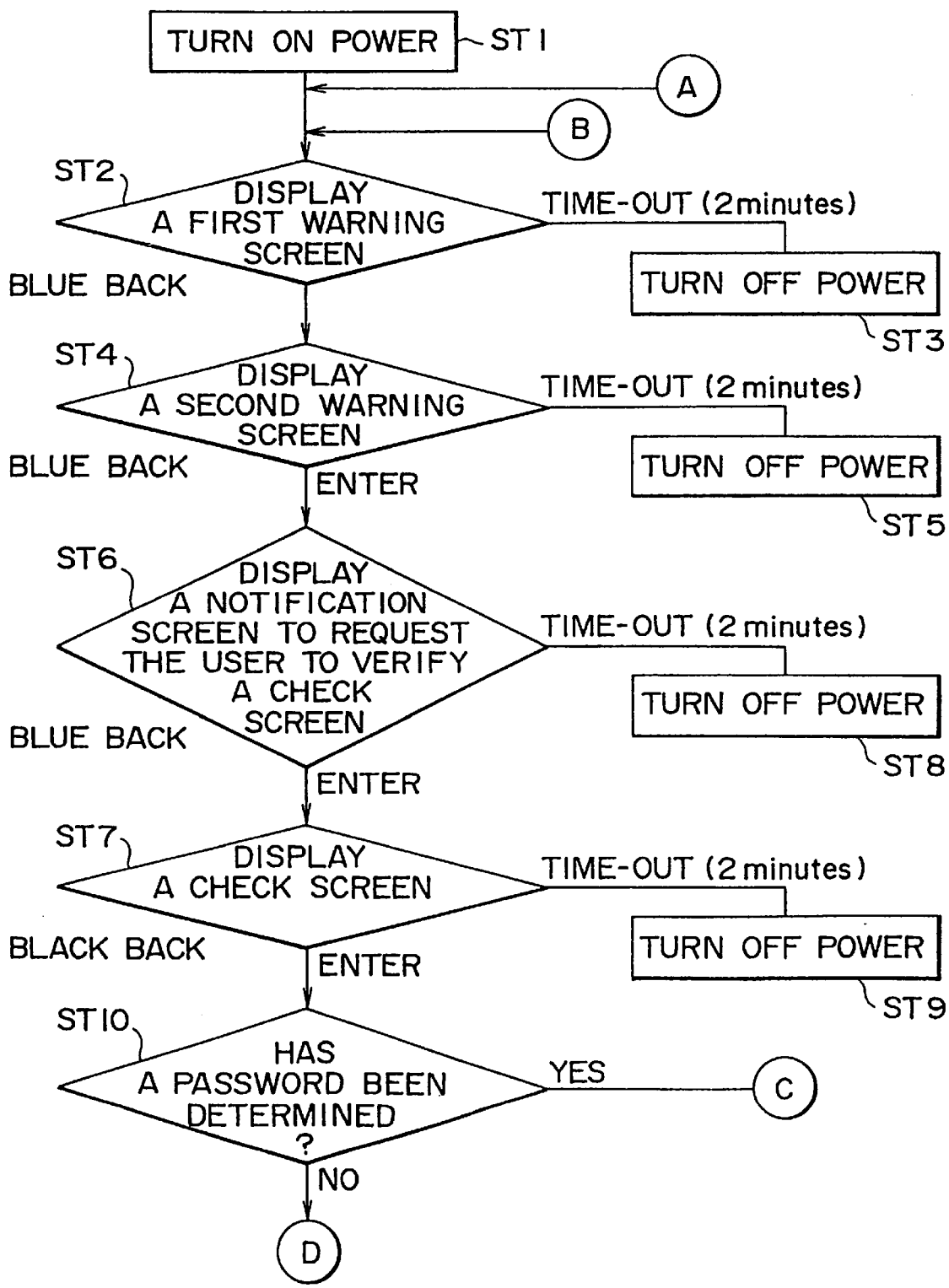
FIG. 7 is a flowchart of a procedure to be followed starting display an image in the optical visualizing apparatus.

FIG. 7 is a diagram showing a flowchart of a procedure to be followed in order to start an operation to display an image in the optical visualizing apparatus. As shown in the figure, the flowchart begins with step ST1, at which the power-supply switch 113 shown in FIG. 1 is turned on to supply electric power from the power-supply circuit 32 shown in FIG. 6 to, among other components, the control unit 33, the video-signal processing circuit 35, the audio-signal processing circuit 36, the LCD driving units 30R and 30L, the LCDs 15R and 15L and the fluorescent lamps 13R and 13L.

The process then goes on to step ST2 at which a first warning screen 33a is displayed as the power is supplied to the control unit 33.

Figure 11:
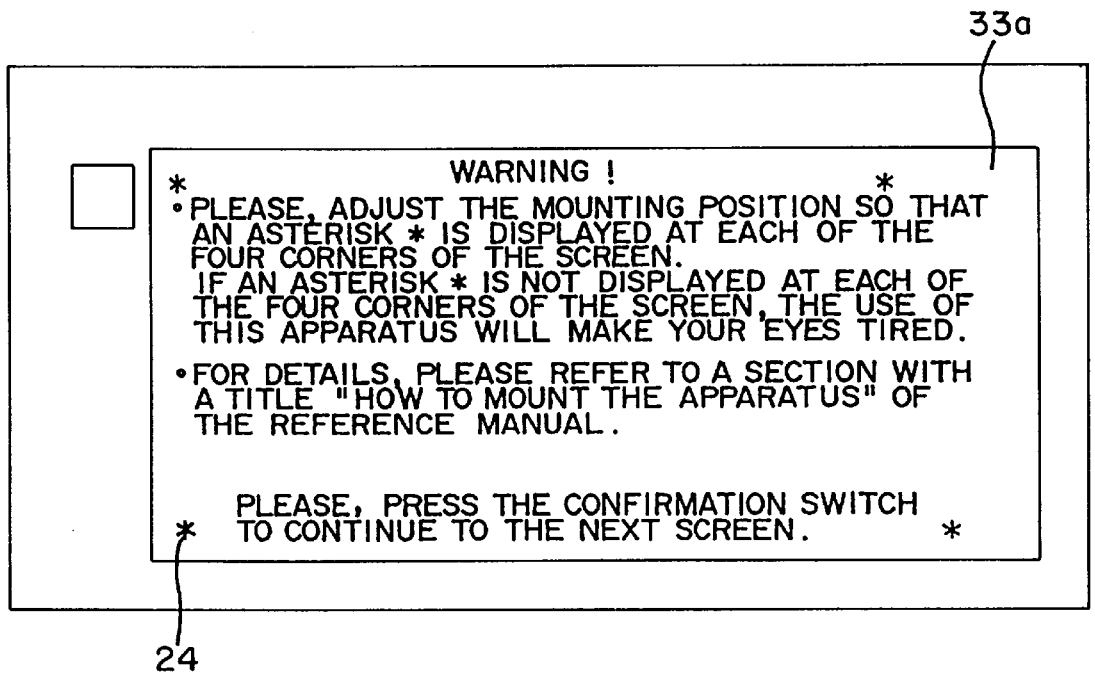
FIG. 11 shows a first warning screen showing the image viewer how to mount the optical visualizing apparatus.

FIG. 11 is a diagram showing the first warning screen 33a which is a blue-back screen with the image and sound muted. The screen displays a warning message to verify the mounting position of the HMD apparatus 1 with a mark 24 such as an asterisk '*' appearing at each of the four corners of the warning screen 33a in a white color. The image viewer is supposed to adjust the mounting position so that the mark 24 (an asterisk '*' in this) is displayed at each of the four corners of the warning screen 33a. When the mark 24 is displayed at each of the four corners of the warning screen 33a, the HMD apparatus 1 is considered to be positioned correctly on the viewer's head. When the confirmation switch 108 shown in FIG. 1 is pressed within a predetermined time, typically two minutes, a next screen is displayed. If the mark 24 is not displayed at each of the four corners of the warning screen 33a, it indicates that the HMD apparatus 1 is not positioned correctly. In this case, since the HMD apparatus 1 may adversely affect the viewer's vision, after a predetermined time has lapsed, the process proceeds to a step ST3 at which the power supply is automatically turned off.

Figure 24A:
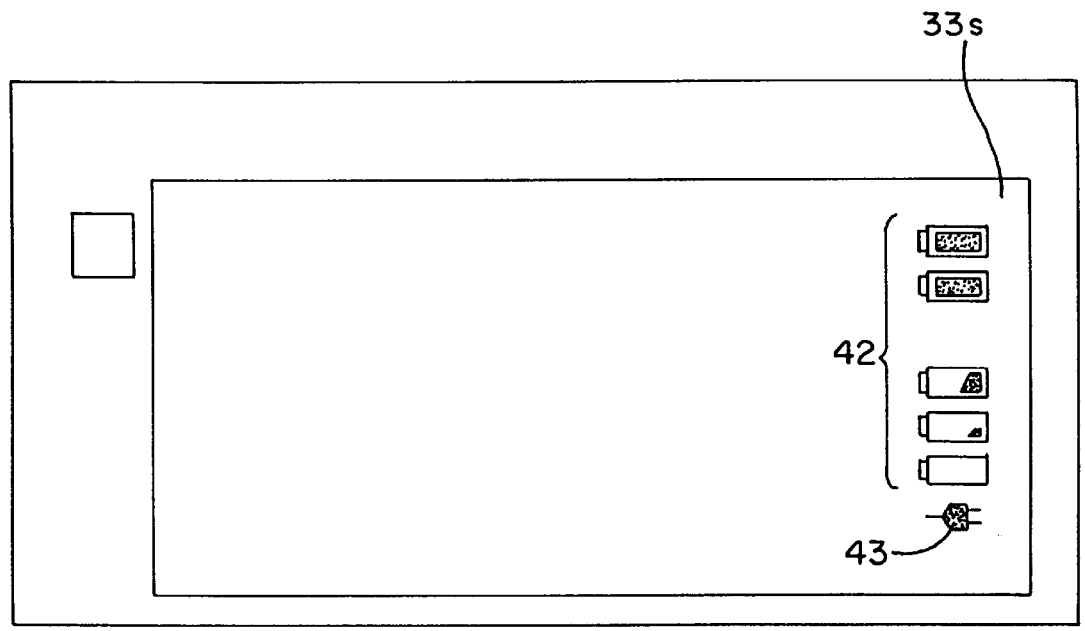
FIGS. 24A and 24B are screens showing residual electric charge remaining in the battery and a screen displaying a message indicating an AV mute screen of the optical visualizing apparatus.
Figure 24B:
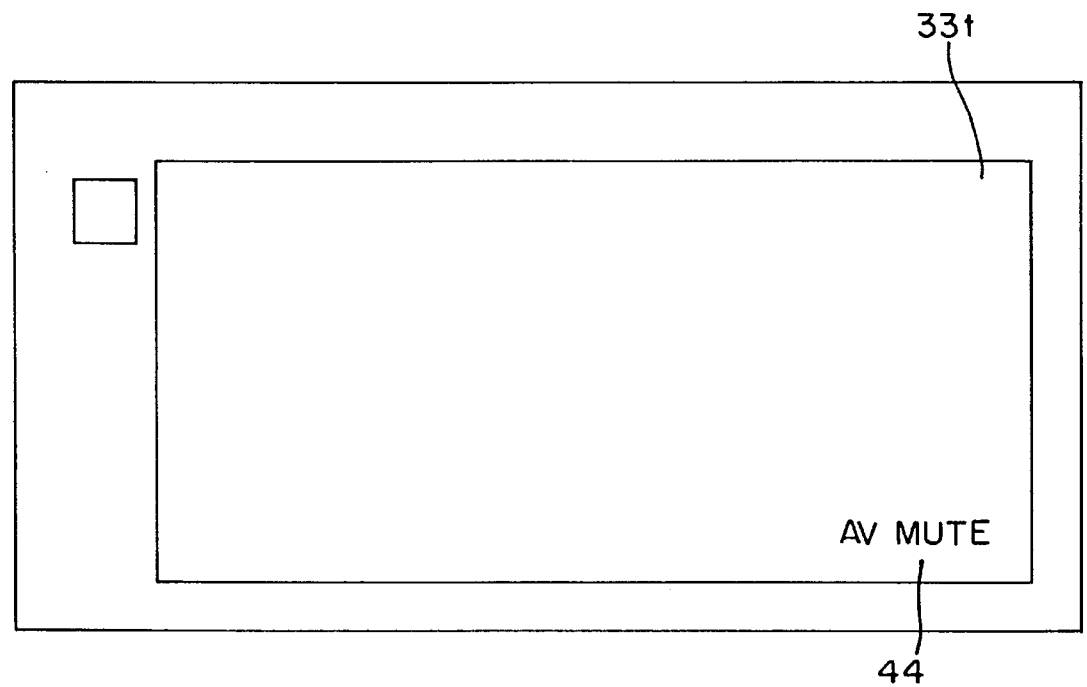

If the mute switch 109 is pressed while the first warning screen 33a is being displayed, the optical visualizing unit 4 enters a transparent state in which external scenery 33t appears on the screen with only the words 'AV mute' displayed thereon as shown in FIG. 24B. If the reset switch 119 is pressed, a password cataloged in a memory unit (not shown) is initialized and nothing is displayed on the screen.

Figure 12A:
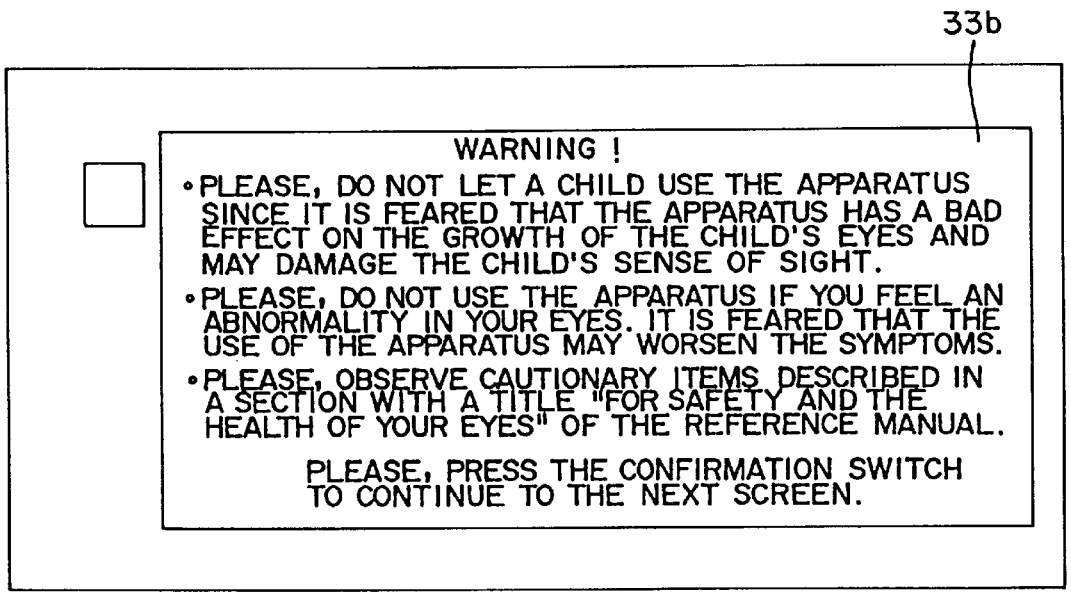
FIGS. 12A and 12B show second and third warning screens warning a viewer against excessive use of the visualizing apparatus.
Figure 12B:
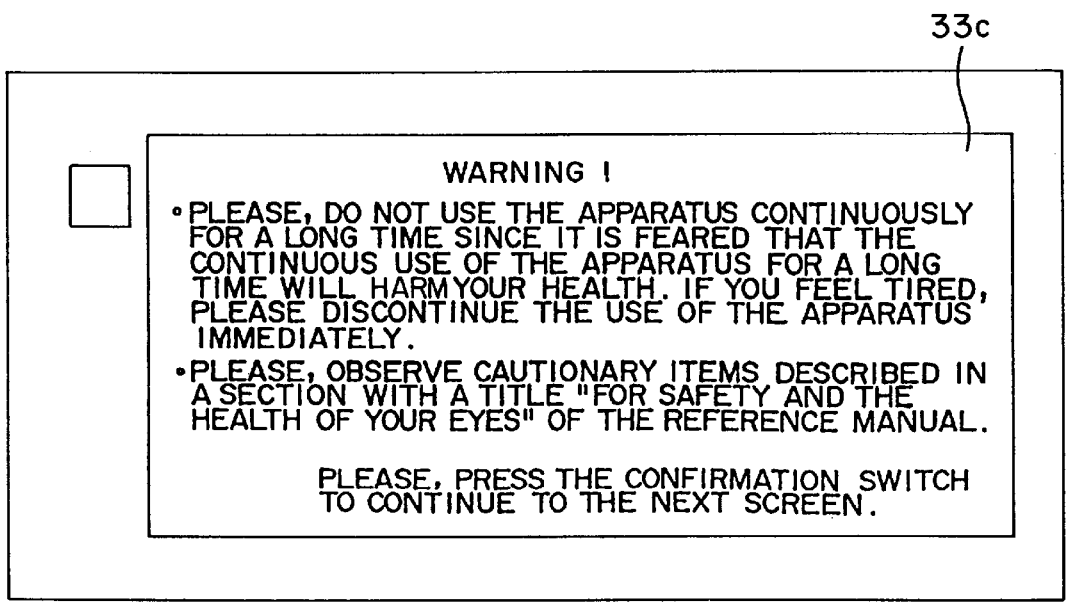

If the confirmation switch 108 is pressed before a predetermined time elapses after the appearance of the first warning screen 33a, the process continues to step ST4 at which second warning screens 33b and 33c, shown in FIGS. 12A and 12B, are displayed. As shown in the figures, the second warning screens 33b and 33c are each a blue-back screen with the image and sound muted. To prevent any harm to the viewer's vision, the warning text is displayed in a white color. FIG. 12A is a diagram showing the second warning message 33b. As shown in FIG. 12A, the second warning message 33b warns against the use of the optical visualizing apparatus 1 by a younger viewer or by a viewer who may feel eyestrain when viewing the images. FIG. 12B is a diagram showing the next second warning message 33c, which is displayed by pressing the confirmation switch 108. As shown in the figure, the next second warning message 33c is a warning message reminding viewers not to use the optical visualizing apparatus 1 for a prolonged time. Both the second warning messages 33b and 33c are a warning message to prevent any negative effects on the viewer.

If the mute switch 109 is pressed while the second warning screen 33b or 33c is being displayed, the optical visualizing unit 4 enters a translucent or transparent state in which external scenery 33t appears on the screen with only the words 'AV mute' displayed thereon as shown in FIG. 24B. If the reset switch 119 is pressed, a password cataloged in the memory unit (not shown) is initialized and nothing is displayed on the screen.

If no vision abnormality or eye fatigue is experienced by the viewer, the display can be continued to a next screen by pressing the confirmation switch 108 within a predetermined time, typically two minutes. If the confirmation switch 108 is not pressed within the predetermined time, a time-out operation occurs. In this case, the process goes on to step ST5, at which the power supply is automatically turned off.

Figure 13:
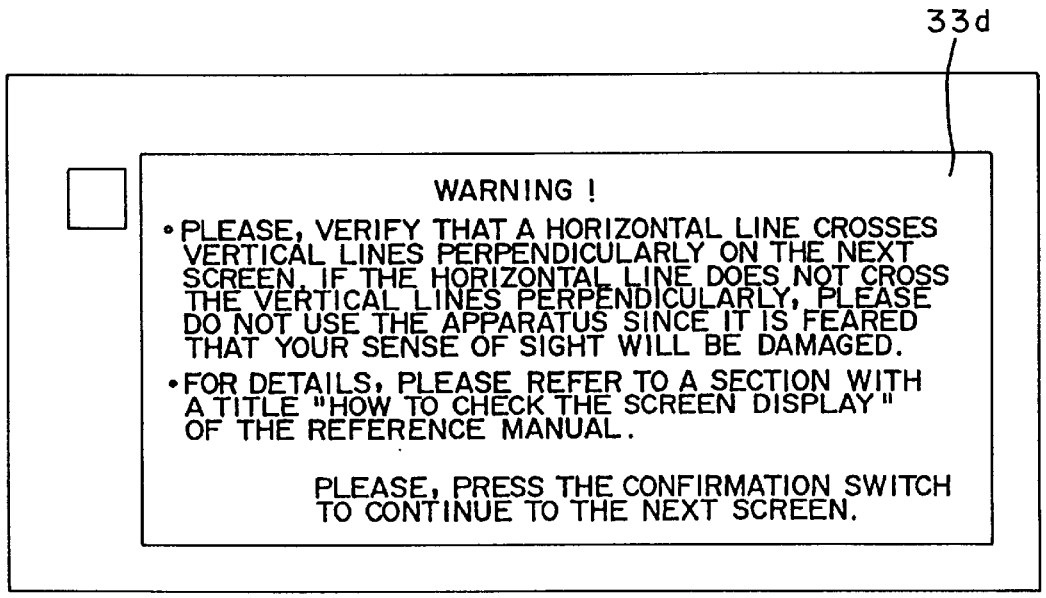
FIG. 13 shows a warning screen regarding adjustment of the position of visualization in the optical visualizing apparatus.

If the confirmation switch 108 is pressed before the predetermined time elapses after the verification of the second warning screens 33b and 33c, the flow proceeds to step ST6 at which a notification screen 33d shown in FIG. 13 for requesting the image viewer to check the screen is displayed. As shown in the figure, the notification screen 33d is a blue-back screen with the image and sound muted. The notification screen 33d displays a notification text in a white color, requesting the image viewer to perform checking to prevent vision problems.

If the mute switch 109 is pressed while the notification screen 33d is being displayed, the optical visualizing unit 4 enters a translucent/transparent state in which external scenery 33t appears on the screen with only the words 'AV mute' displayed thereon as shown in FIG. 24B.

Figure 14A:
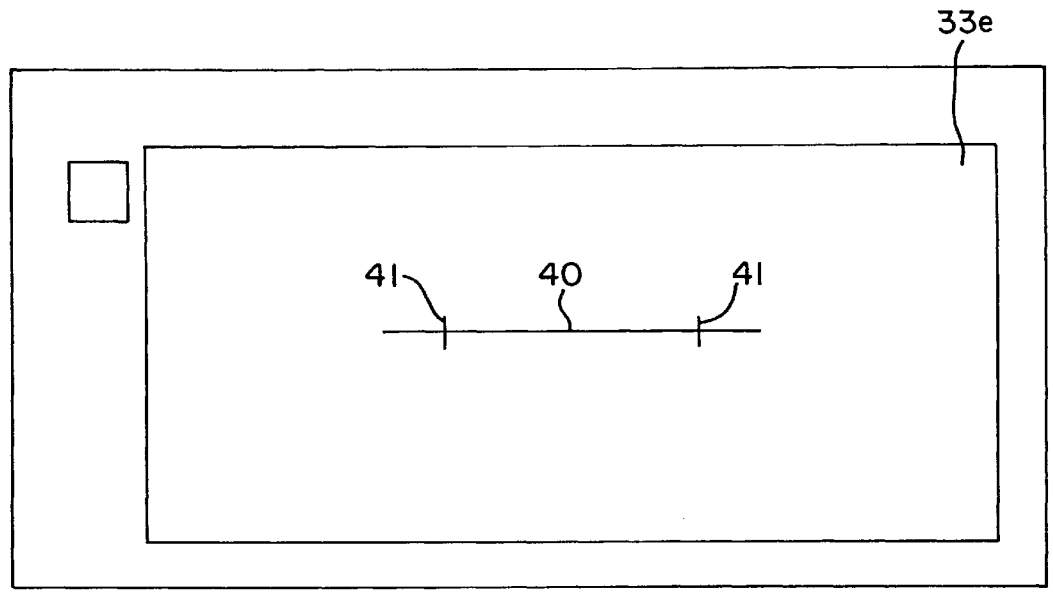
FIGS. 14A and 14B show check screens used for adjusting the position of visualization in the optical visualizing apparatus.
Figure 14B:
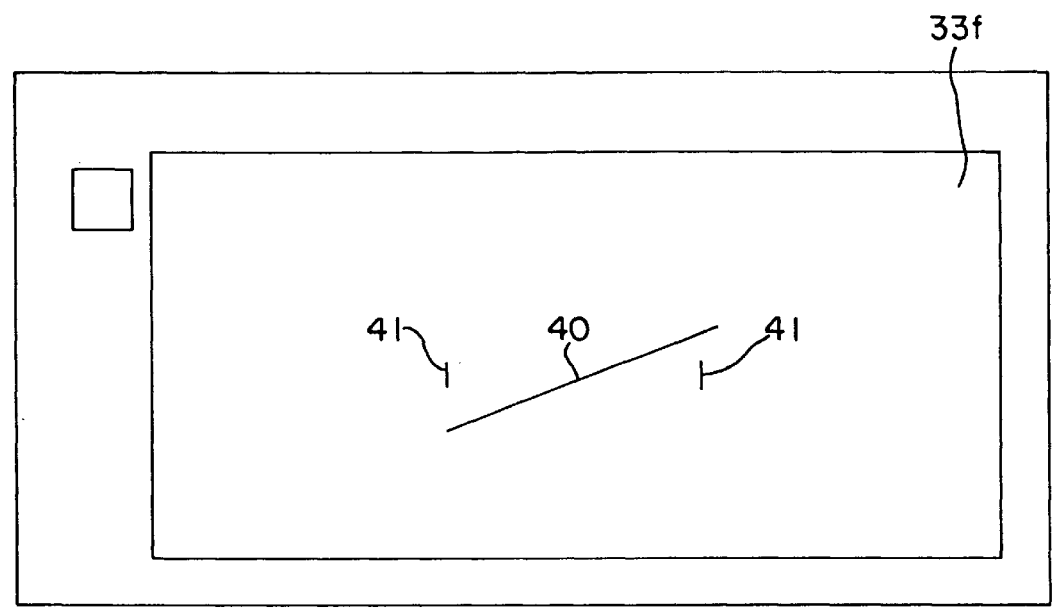

If the confirmation switch 108 is pressed before a predetermined time, typically two minutes after verifying notification text of the notification screen 33d, the process proceeds to step ST7 at which check screens 33e and 33f shown in FIGS. 14A and 14B are displayed. If the confirmation switch 108 is not pressed even after the predetermined time has lapsed since the verification of the notification text, however, a time-out operation occurs. In this case, the process proceeds to a step ST8 at which the power supply is turned off automatically.

Each check screen 33e and 33f is a screen for checking whether or not the viewing position of the EMD apparatus 1 is and the position of the viewer's eyes are aligned appropriately. FIG. 14A is a diagram showing the check screen 33e. As shown in the figure, the check screen 33e is a black-back screen. Near the center of the check screen 33e, a horizontal line 40 and two vertical lines 41 are displayed in a white color. The LCDs 15R and 15L employed in the liquid-crystal unit 9 of the HMD apparatus 1 display the horizontal line 40 and the vertical lines 41 so that the horizontal line 40 and the vertical lines 41 are seen by the left and right eyes of the image viewer respectively.

If the HMD 1 and the optical visualizing apparatus body 2 are set in the proper position on the viewer's head, the check screen 33e is displayed with the vertical lines 41 crossing the horizontal line 40 perpendicularly, as shown in FIG. 14A. If the position of the HMD 1 and the optical visualizing apparatus body 2 is not correct, on the other hand, the vertical lines 41 on the check screen 33f do not cross the horizontal line 40 perpendicularly, as shown in FIG. 14B.

If the mute switch 109 is pressed while the check screen 33e or 33f is being displayed, the optical visualizing unit 4 enters a translucent/transparent state in which external scenery 33t appears on the screen with only the words 'AV mute' displayed thereon as shown in FIG. 24B.

After the visualization position is determined to be correct by verifying the directions of the horizontal line 40 and the vertical lines 41 of the check screen 33e or 33f, a next screen can be displayed by pressing the confirmation switch 108. If the confirmation switch 108 is not pressed within a predetermined time, typically two minutes, a time-out operation occurs. In this case, the process goes on to step ST9, at which the power supply is automatically turned off.

If a reset switch 119 is pressed while the notification screen 33d shown in FIG. 13 is being displayed at step ST6 or the check screen 33e or 33f shown in FIGS. 14A and 14B are being displayed at step ST7, the password cataloged in the memory unit (not shown) is initialized and nothing is displayed on the screen.

If the confirmation switch 108 is pressed after a correct visualization position has been verified by using the check screens 33e and 33f shown in FIGS. 14A and 14B, the process goes on to step ST10 to judge whether or not a password has been determined.

Figure 8:
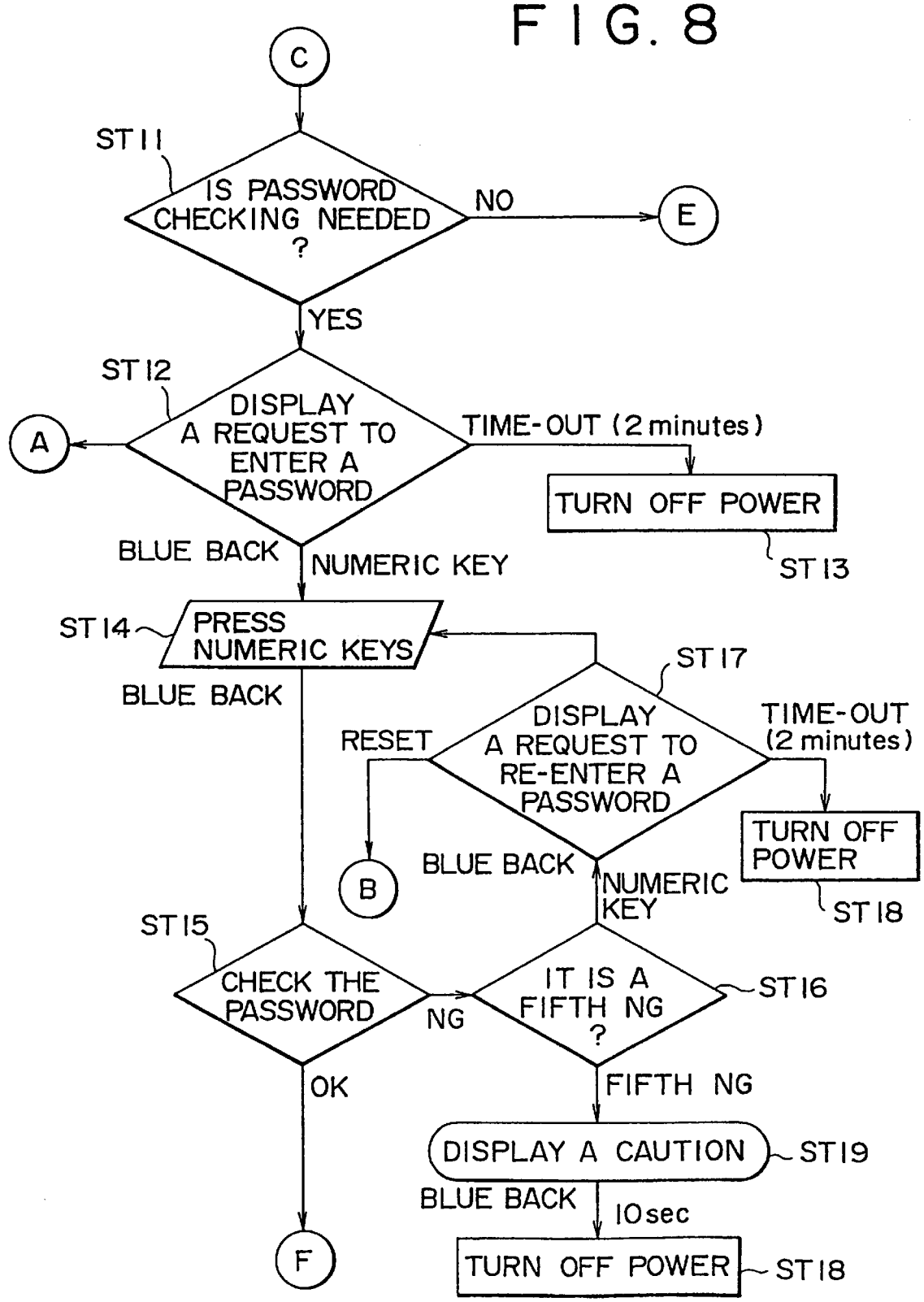
FIG. 8 is a flowchart of a procedure for a password checking procedure for the optical visualizing apparatus.

If a password has been determined, the process proceeds to step ST11, shown in FIG. 8, to judge whether or not it is necessary to check the password.

Figure 9:
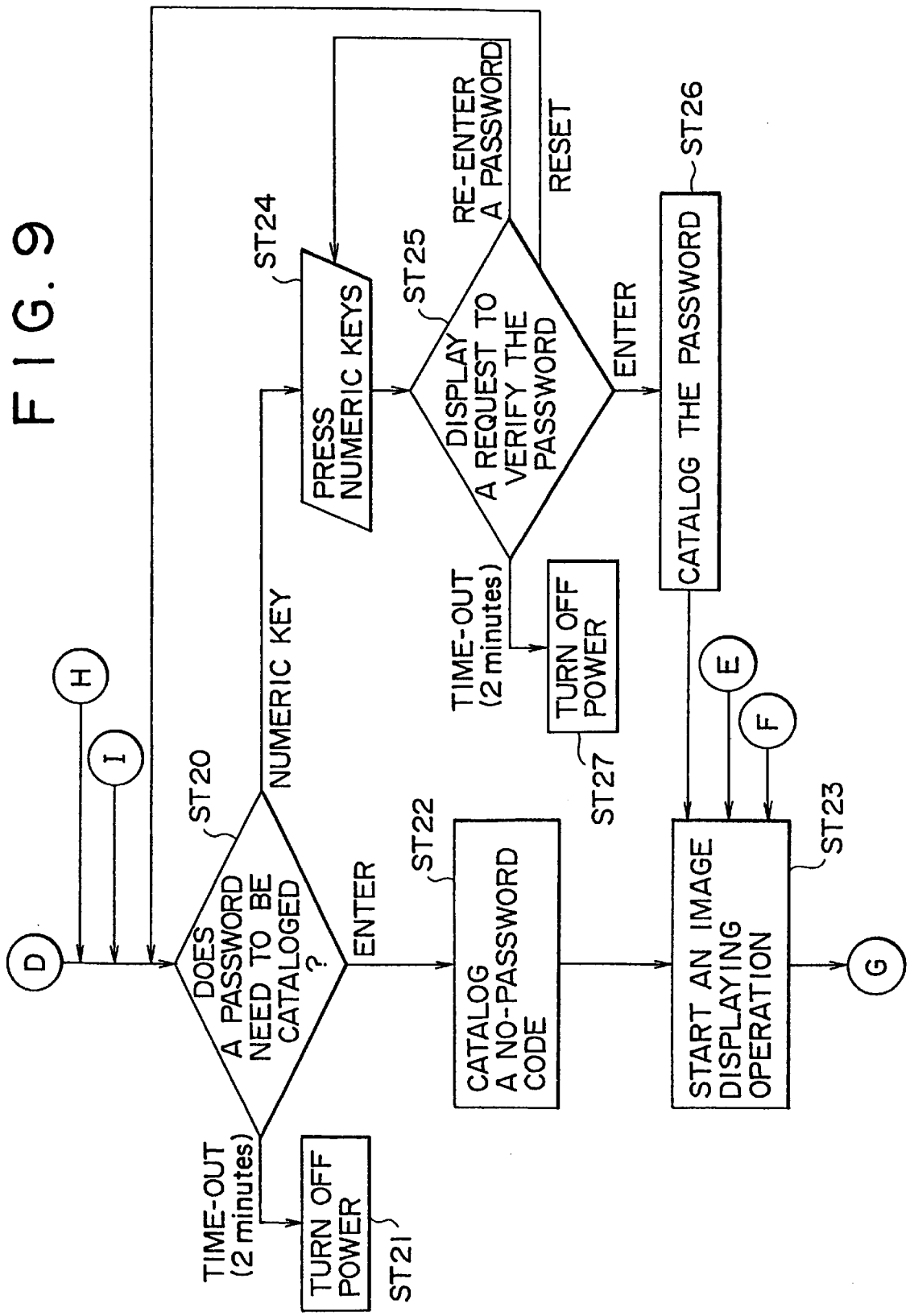
FIG. 9 is a flowchart of a procedure for cataloging a password entered into the optical visualizing apparatus.

If it is not necessary to check the password, the process goes on to step ST23, shown in FIG. 9, at which the display of an image at the LCDs 15R and 15L shown in FIG. 6 is started.

Figure 15:
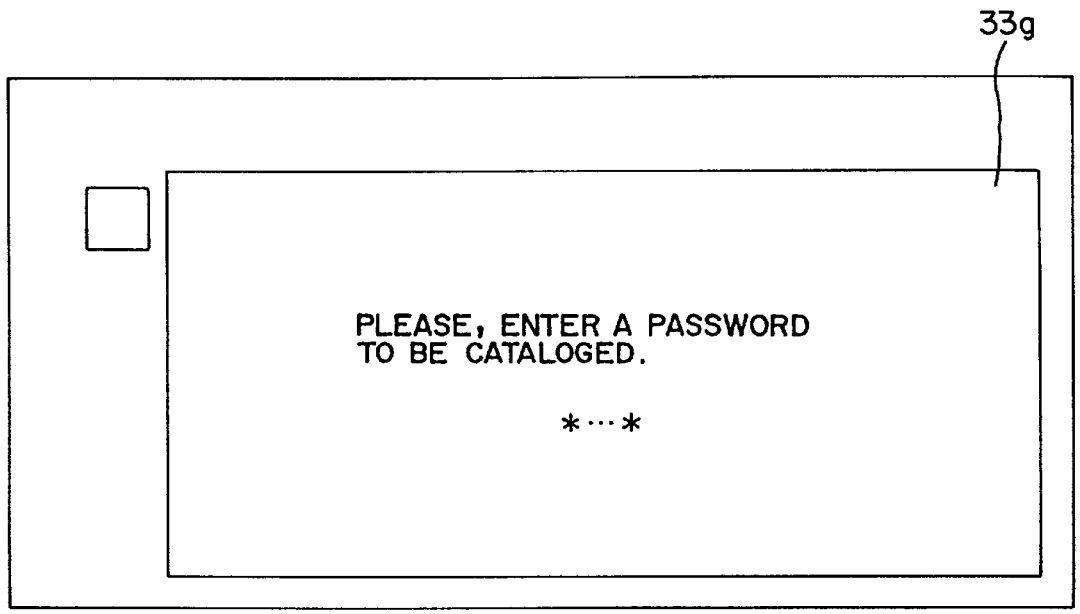
FIG. 15 shows a screen for requesting the viewer to enter a password into the optical visualizing apparatus.

If it is necessary to check the password, on the other hand, the process proceeds to step ST12, at which a message screen 33g shown in FIG. 15 is displayed to request the image viewer to enter a password. The password requesting screen 33g is a blue-back screen with the image and sound muted and characters composing: "Please, enter a password" displayed in a white color.

If the mute switch 109 is pressed while the password requesting screen 33g is being displayed, the optical visualizing unit 4 enters a translucent/transparent state in which external scenery 33t appears on the screen with only the words 'AV mute' displayed thereon as shown in FIG. 24B. If the reset switch 119 is pressed, the password cataloged in a memory is initialized and the process returns to step ST2, where the first warning screen 33a shown in FIG. 11 is displayed.

If a password is not entered by the image viewer even after a predetermined time, typically two minutes, has elapsed after the password requesting screen 33g, a time-out occurs. In this case, the process goes on to step ST13 at which the power supply is automatically turned off.

If a password is entered by the image viewer before the predetermined time elapses, however, the process goes on to a step ST14 at which the password entered by the image viewer is input. The process then proceeds to step ST15 at which the input password is compared with a password cataloged in the memory unit.

If the input password matches the password cataloged in the memory unit, the process goes on to step ST23 at which the image display operation is started.

Figure 16:
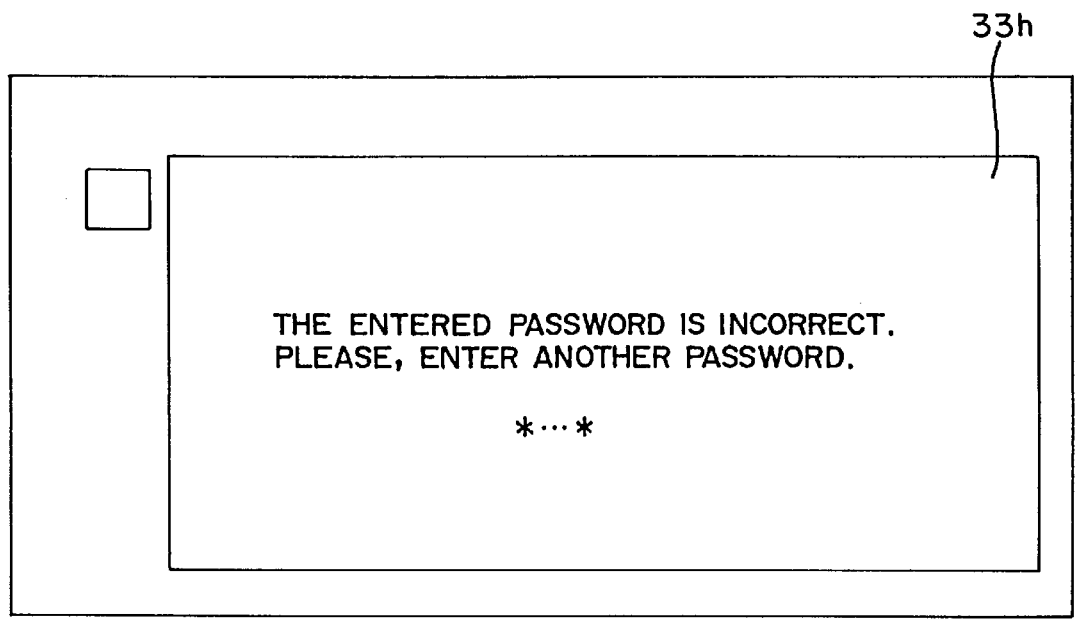
FIG. 16 shows a screen for requesting the viewer to re-enter a password into the optical visualizing apparatus.

If the input password does not match the password cataloged in the memory unit, however, a so-called "NG" case results. In this case, the process continues to step ST16 to check whether the "NG" case has occurred before and whether the current "NG" case is a first to fourth "NG" occurrence. If the current "NG" case is a first to fourth "NG" occurrence, the process continues to step ST17, at which the screen 33h shown in FIG. 16 is displayed to again request the image viewer to enter a password. The password requesting screen 33h is also a blue-back screen with the words: "The entered password is incorrect. Please, enter another password" displayed in a white color.

If the mute switch 109 is pressed while the password requesting screen 33g or 33h is being displayed, the optical visualizing unit 4 enters a translucent/transparent state in which external scenery 33t appears on the screen with only the words 'AV mute' displayed thereon as shown in FIG. 24B. If the reset switch 119 is pressed, however, the password catalog ed in the memory unit is initialized and then the process returns to step ST2, at which the first warning screen 33a shown in FIG. 11 is displayed.

If a password is not entered by the viewer even after a predetermined time, typically two minutes, has elapsed since the appearance of the password requesting screen 33h, a time-out operation occurs. In this case, the process goes on to step ST18, at which the power supply is automatically turned off.

If a password is entered by the viewer before the predetermined time elapses, however, the process goes on to step ST14 at which the password entered by the image viewer is input. The process then proceeds to step ST15 at which the input password is compared with the password cataloged in the memory unit.

If the input password matches the password cataloged in the memory unit, the process goes on to step ST23 at which the operation is started.

Figure 17:
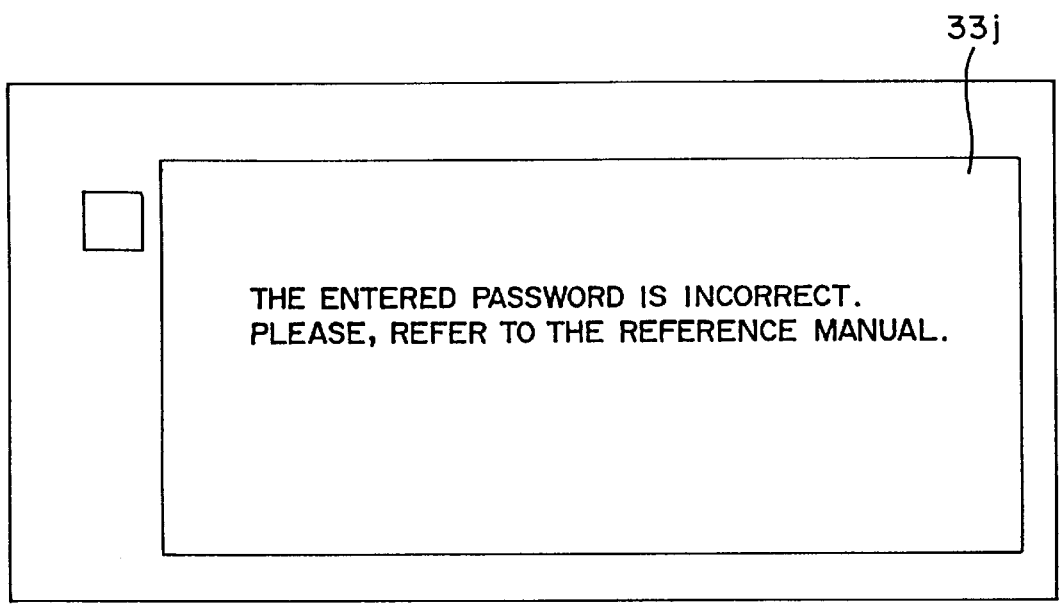
FIG. 17 shows a cautionary screen of the optical visualizing apparatus.

If the input password does not match the password cataloged in the memory unit, on the other hand, the so-called "NG" case results. In this case, the process continues to step ST16 to check whether the "NG" case has occurred before and whether the current "NG" case is a first to fourth "NG" occurrence. If the current "NG" case is a first to fourth "NG" occurrence, the process continues to step ST17, at which the screen 33h is displayed to again request the image viewer to enter a password. If the current "NG" case is a fifth "NG" occurrence, however, the process continues to step ST19 at which a warning screen 33j shown in FIG. 17 is displayed. The warning screen is also a blue-back screen with the image and sound muted and the message: "The entered password is incorrect. Please, refer to the reference manual" displayed in a white color.

If the mute switch 109 is pressed while the warning screen 33j is being displayed, the optical visualizing unit 4 enters a translucent/transparent state in which external scenery 33t appears on the screen with only the words 'AV mute' displayed thereon as shown in FIG. 24B. If the reset switch 119 is pressed, however, the password cataloged in the memory unit is initialized but nothing is displayed on the screen.

After a predetermined time, typically 10 seconds, has elapsed since the appearance of the warning screen 33j, the process goes on to step ST18 at which the power supply is automatically turned off.

Figure 18:
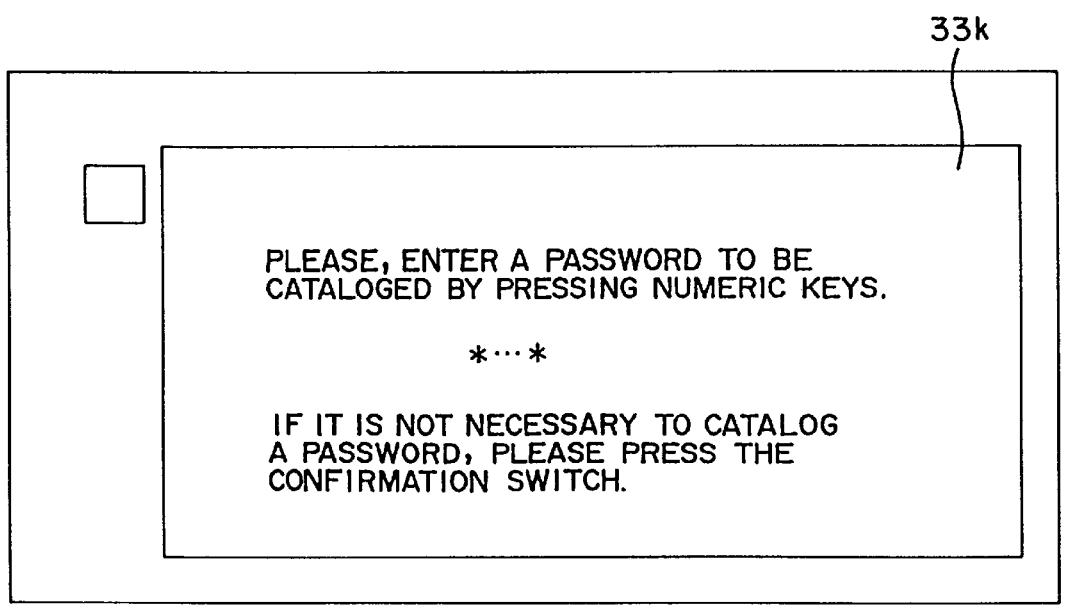
FIG. 18 is a screen for verifying whether or not a password needs to be cataloged.

If a password is found not undetermined yet at the step ST10, on the other hand, the process goes on to step ST20 shown in FIG. 9, at which a screen 33k shown in FIG. 18 is displayed to confirm whether or not it is necessary to catalog a password. The screen 33k states in a white color: "Please, enter a password to be cataloged by pressing numeric keys. If it is not necessary to catalog a password, please press the confirmation switch."

If the mute switch 109 is pressed while the screen 33k is being displayed, the optical visualizing unit 4 enters a translucent/transparent state in which external scenery 33t appears on the screen with only the words 'AV mute' displayed thereon as shown in FIG. 24B. If the reset switch 119 is pressed, instead, the same screen 33k is displayed. If nothing is entered, that is, if neither a password to be cataloged is entered nor the confirmation switch 108 is pressed before a predetermined time, typically two minutes, elapses after the appearance of screen 33k, a time-out operation occurs. In this case, the process goes on to step ST21, at which the power supply is turned off automatically.

If the confirmation switch 108 is pressed to indicate that it is not necessary to catalog a password, the process proceeds to step ST22, at which a code indicating that no password is required is cataloged. The process then goes on to step ST23, at which an image display operation is started.

Figure 19:
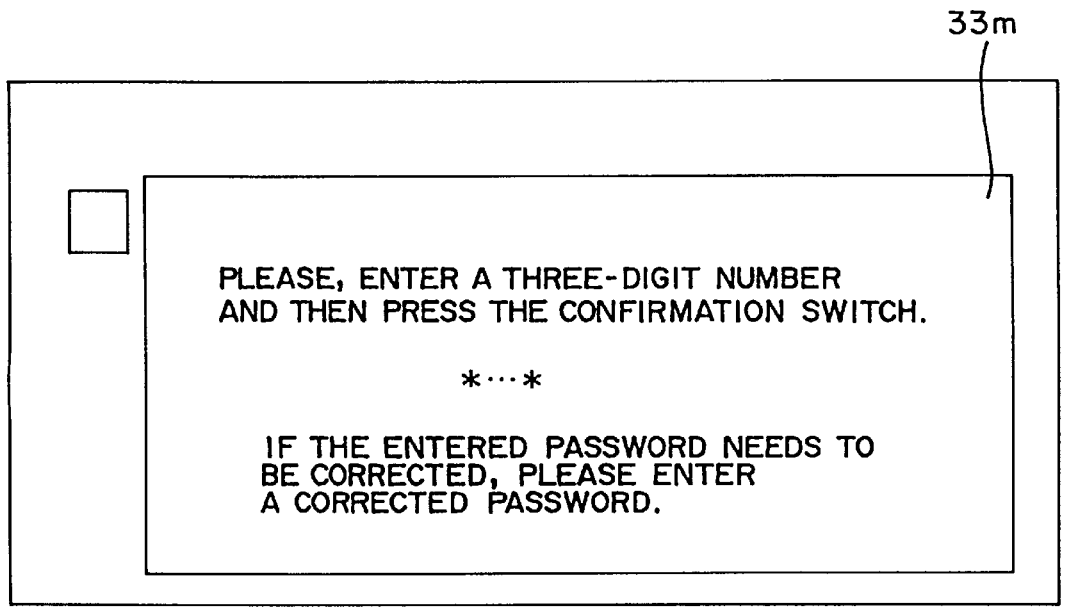

If a numeric key 114 representing a digit of a desired password is pressed to indicate that the desired password is to be cataloged, the process goes on to step ST24 at which the remaining digits of the password to be cataloged are entered. The process then proceeds to step ST25, at which the screen is switched to a number verification screen 33m shown in FIG. 19. At the step ST25, the viewer verifies the entered password displayed on the number verification screen 33m. If the entered password is correct, the viewer presses the confirmation switch 108. In this case, the process goes on to step ST26, at which the entered password is cataloged in the memory unit. If the entered password needs to be corrected, the process returns to step ST24. At step ST24, another password is entered.

If the mute switch 109 is pressed while the number verification screen 33m is being displayed at step ST25, the optical visualizing unit 4 enters a translucent/transparent state in which external scenery 33t appears on the screen with only the words 'AV mute' displayed thereon as shown in FIG. 24B. If the reset switch 119 is pressed, however, the process returns to step ST20 at which the screen 33k shown in FIG. 18 is displayed to confirm whether or not it is necessary to catalog a password.

If the viewer does nothing, that is, if the viewer does not enter another password at step ST20 or press the confirmation switch 108 or the reset switch 119 at step ST25, a time-out operation occurs. In this case, the process proceeds to step ST21 or step ST27 after a predetermined time, typically two minutes, elapses after the appearance of the screen 33k or 33m. At the step ST21 or ST27, the power supply is automatically turned off.

If the viewer enters a password at steps ST20 and ST24 but the digits of the password are not entered continuously, i.e., if a predetermined time elapses after the first digit is entered before the second digit, the process goes on to step ST27, at which the power supply is automatically turned off.

After the password has been cataloged at step ST26, the process proceeds to step ST23 at which an image display operation is started and a tracking operation monitoring the image display time begins. If the mute switch 109 is pressed while an image is being displayed, the optical visualizing unit 4 enters a translucent/transparent state and terminates a video and audio signal output and operation from a signal source, such as AV equipment, to the HMD apparatus 1. If the mute switch 109 is pressed again, the optical visualizing apparatus 4 returns to the state before the mute switched was pressed, that is, the state in which the image is displayed. In this state, the video and audio signal output to the HMD apparatus 1 is resumed, allowing continuous images and sound to be obtained. When the video and audio signals are not supplied to the HMD apparatus 1, the image display time tracking is also suspended as well.

Figure 10:
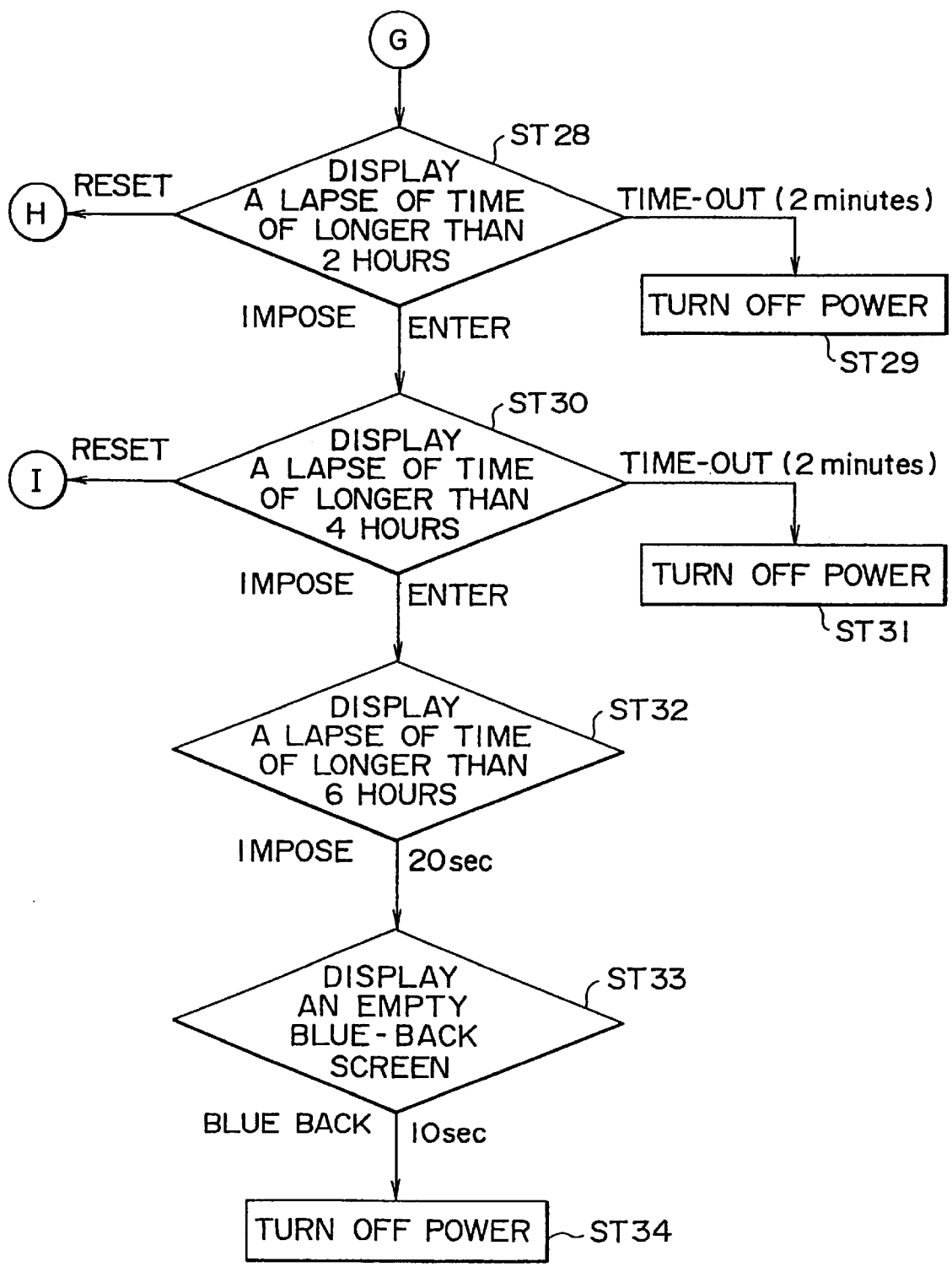
FIG. 10 is a flowchart of a procedure to be followed after images have been displayed in the optical visualizing apparatus.
Figure 20:
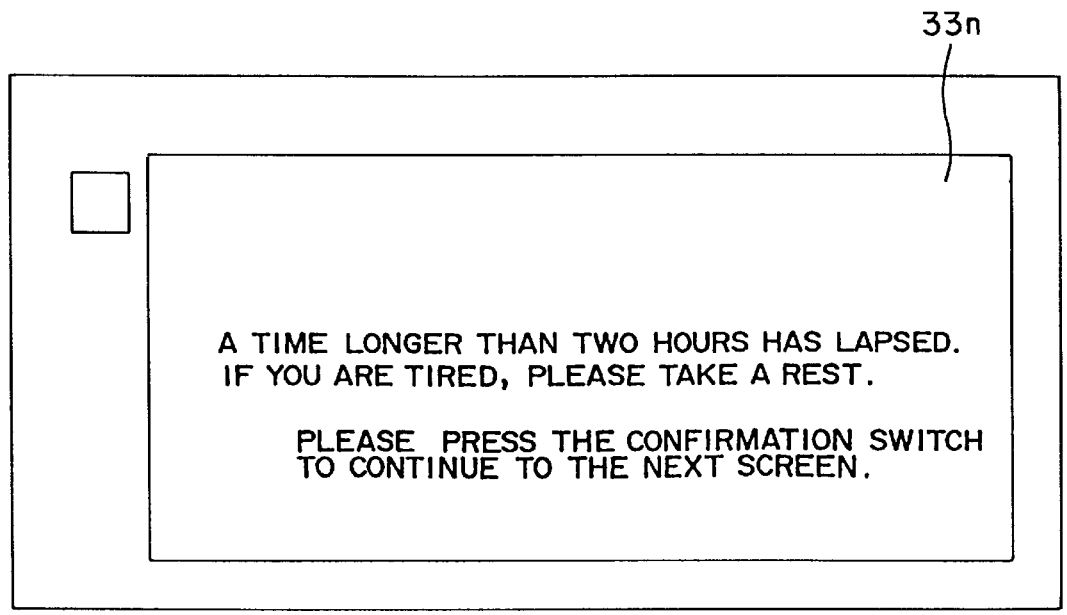
FIG. 20 is a screen warning the viewer against the long use of the optical visualizing apparatus.

After two hours has elapsed after the start of the image display operation, the process goes on to step ST28 shown in FIG. 10 at which a warning requesting screen 33n shown in FIG. 20 is displayed. The screen 33n displays a warning saying: "A time longer than two hours has lapsed. If you are tired, please take a rest." The warning is superimposed on an image being displayed. At that time, the sound is muted.

If the reset switch 119 is pressed while the warning screen 33n is being displayed, the process returns to step ST20 at which the cataloged password is initialized and the screen 33k shown in FIG. 18 is displayed to verify whether or not a new password needs to be cataloged.

If the viewer does not feel tired at this point of time, the viewer presses the confirmation switch 108 to continue the image display operation. If the viewer feels tired, however, the viewer does not need to press the confirmation switch 108, leaving the optical visualization apparatus 4 as is. If a predetermined time, typically two minutes, elapses and the viewer has not initiated any operations after the appearance of the screen 33n, a time-out operation occurs. In this case, the process goes on to step ST29, at which the power supply is automatically turned off.

Figure 21:
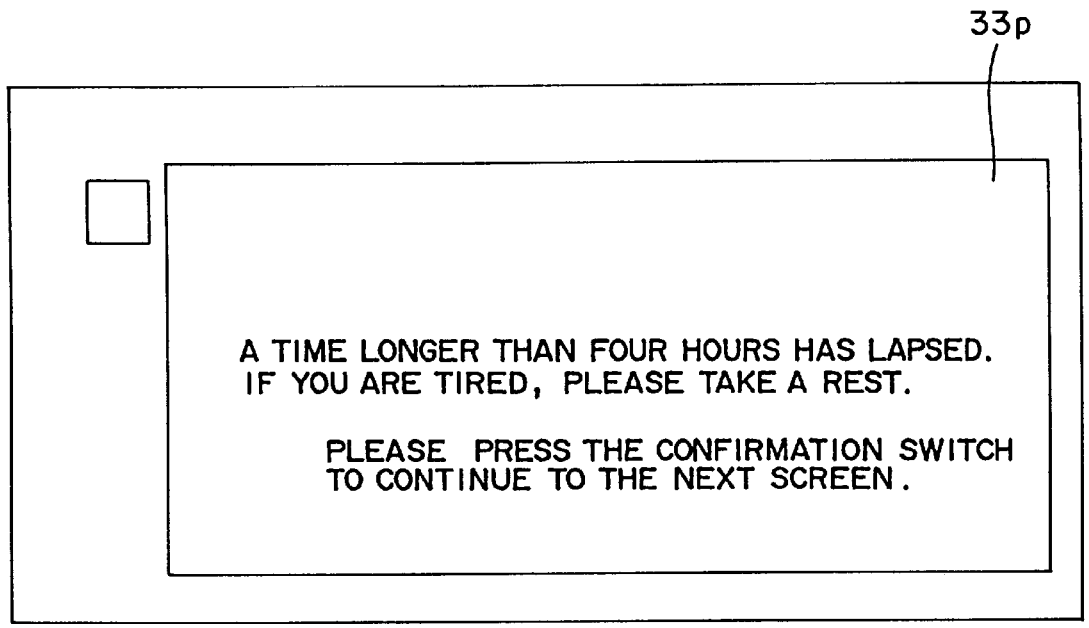
FIG. 21 is a screen warning the viewer against the long use of the optical visualizing apparatus.

After four hours have elapsed after the start of the image display operation, the process goes on to step ST30, at which a warning screen 33p shown in FIG. 21 is displayed. The screen 33p displays the words: "A time longer than four hours has lapsed. If you are tired, please take a rest." The warning is superimposed on the image being displayed. At that time, the sound is muted.

If the reset switch 119 is pressed while the warning screen 33p is being displayed, the process returns to step ST20 at which the cataloged password is initialized and the screen 33k shown in FIG. 18 is displayed to verify whether or not a new password needs to be cataloged.

If the viewer does not feel tired at this time, the viewer presses the confirmation switch 108 to continue the image display operation. If the viewer feels tired, however, the viewer does not need to press the confirmation switch 108, leaving the optical visualization apparatus 4 as is. After a predetermined time, typically two minutes, elapses after the appearance of the screen 33p with no operations carried out by the viewer, a time-out operation occurs. In this case, the process goes on to step ST31, at which the power supply is automatically turned off.

Figure 22:
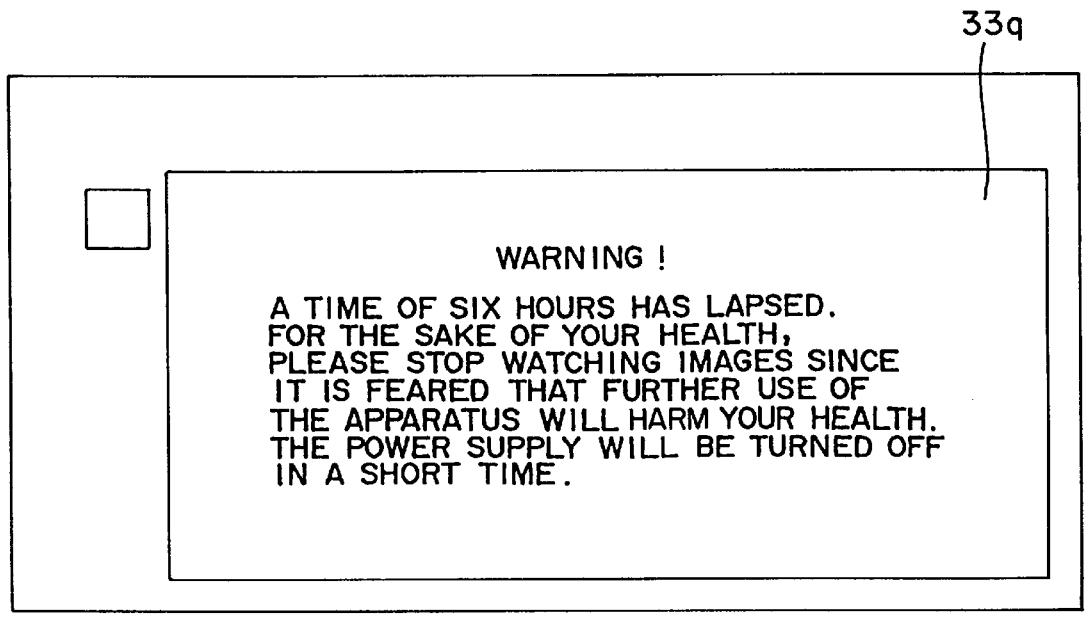
FIG. 22 is a screen warning the viewer against the long use of the optical visualizing apparatus.

After six hours have elapsed since the start of the image display operation, the process goes on to a step ST32 at which a warning screen 33q shown in FIG. 22 is displayed. The screen 33q displays a warning saying: "A time of six hours has lapsed. For the sake of your health, please stop watching images since it is feared that further use of the apparatus will harm your health. The power supply will be turned off in a short time." The warning is superimposed on an image being displayed. The screen is displayed for a predetermined time, typically twenty seconds, without muting the sound.

After the 20-second time elapses, the process continues to step ST33 at which the screen turns into a blue-back screen with both the image and sound muted. Then, after a predetermined time, typically ten seconds has elapsed after the appearance of the blue-back screen, the process proceeds to step ST34, at which the power supply is turned off automatically.

If the reset switch 119 is pressed while the warning screen 33q is being displayed at step ST32 or the blue-back screen is being displayed at the step ST33, the cataloged password is initialized but no image display or screen change is conducted.

Figure 23:
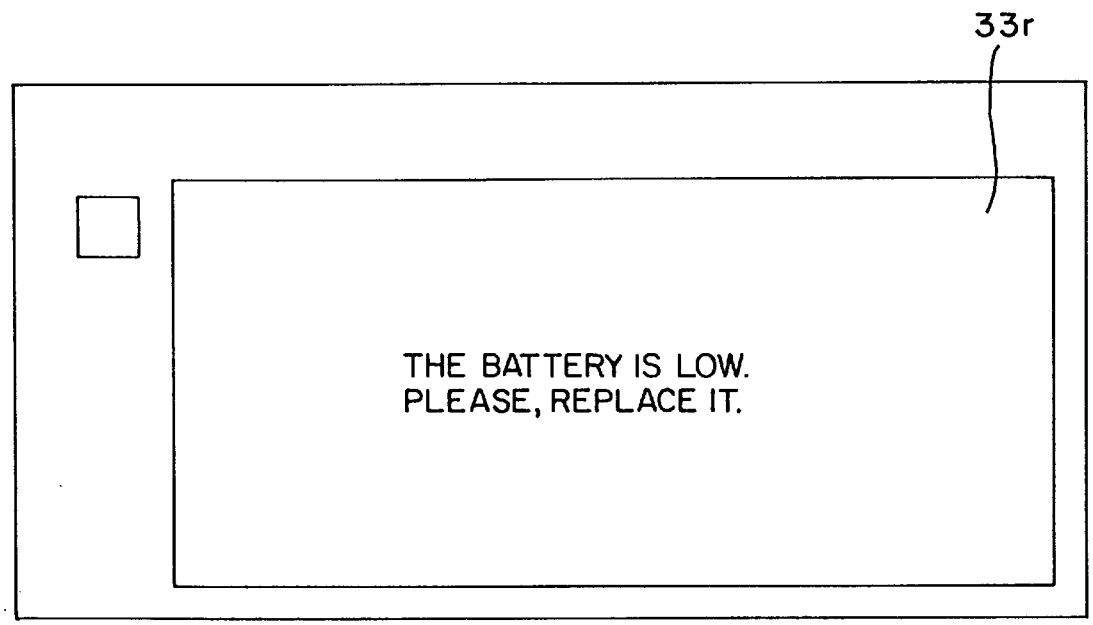
FIG. 23 is a screen notifying the viewer that the electric charge of the battery employed in the optical visualizing apparatus is low.

If the battery 115 runs out after the power supply is turned on at step ST1, a warning screen 33r shown in FIG. 23 is displayed even if an image display operation is occurring. As shown in the figure, the screen contains a warning in a white color which says: "The battery is low. Please, replace it." The screen 33r is also a blue-back screen with both the image and sound muted. After a predetermined time, typically five seconds, after the appearance of the screen 33r has elapsed, the power supply is turned off automatically.

The image viewer can check for residual electric power in the battery 115 while an image display operation is occurring by pressing a battery-residual-power displaying key (not shown). When the battery-residual-power displaying key is pressed, a screen 33s showing the residual electric power of the battery 115, as shown in FIG. 24A, is displayed. The screen 33s is a blue-back screen showing a white color battery drawing 42 indicating the amount of residual electric power in the battery 115 and a white color plug drawing 43 illustrating that electric power is supplied via a plug with both the image and sound muted. The battery-residual-power displaying screen 33s automatically disappears after a predetermined time of typically five seconds, restoring the display to the original screen shown before the battery-residual-power displaying screen 33s was displayed. If the confirmation switch 108 is pressed before the predetermined time elapses, the original screen is restored automatically.

When there are no signals, for example, when there is no video signal and there is no signal coming from the character generator 34, a blue-back screen appears with nothing displayed.

As described above, in the present embodiment, the image display starts after the password verification operation (steps ST11 to ST27, except step ST23), are carried out. It should be noted, however, that the description is not intended to be construed in a limiting sense. That is to say, it is to be understood that the subject matter encompassed by the present invention is not limited to the embodiment described above. For example, the password verification operation can be eliminated altogether. In other words, an image display operation can be started if only the warning display operation and the visualization position check have been carried out through steps ST1 to ST9. In addition, the display screen operation showing the lapses of time, which are carried out at steps ST30 to ST36, can also be omitted.

Next, control of a power-supply voltage used in the liquid-crystal shutter is explained by referring to FIGS. 25 and 26A–D.

The power-supply voltage used in the liquid-crystal shutter 23 is supplied through a common transparent electrode on one side of the first liquid-crystal board 25 for implementing two-division driving. By using static driving for opening and closing the liquid crystal, the first and second liquid-crystal boards 25 and 26 are driven separately. A low-power-supply driven liquid-crystal adjusting circuit 28 is used as a circuit for implementing two-division driving. In the low-power-supply driven liquid-crystal adjusting circuit 28, a signal obtained by inverting the amplitude of a power-supply voltage required by the two-division driving circuit is used as a common signal and the amplitude of the power-supply voltage used in one of the liquid-crystal boards is reduced by half.

Figure 25:
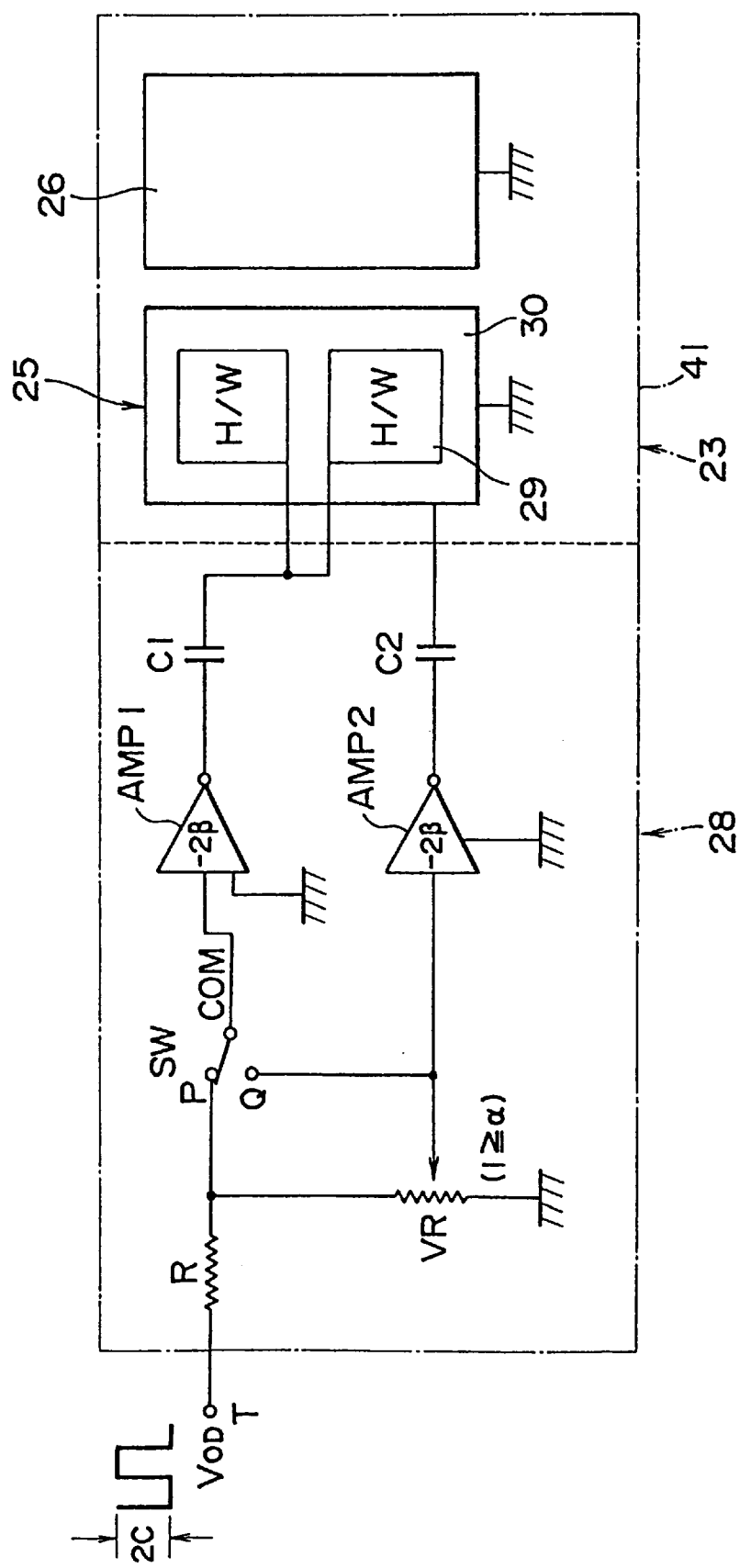
FIG. 25 is a schematic diagram showing an embodiment implementing a control circuit of the liquid-crystal shutter.

FIG. 25 is a diagram showing an embodiment of the low-power-supply driven liquid-crystal adjusting circuit 28. As shown in the figure, the low-power-supply driven liquid-crystal adjusting circuit 28 includes: (1) a terminal T for inputting a predetermined power-supply voltage VOD with an amplitude 2C; (2) a switch SW with a pole P connected to the terminal T through a series protective resistor R; (3)

a variable resistor VR with one end connected to an end of the protective resistor R that is connected to the pole P of the switch SW and the other end grounded; (4) a doubling-amplification amplifier AMP1 with the input connected to a common pole COM of the switch SW; (5) a doubling-amplification amplifier AMP2 with the input connected to another pole Q of the switch SW as well as to a sliding terminal of the variable resistor VR; (6) a smoothing capacitor C1 provided between the output of the doubling-amplification amplifier AMP1 to an electrode of the liquid crystal of the first liquid-crystal board 25 with a liquid-crystal display range H/W; and (7) a smoothing capacitor C2 provided between the output of the doubling-amplification amplifier AMP2 to the electrode of the liquid crystal of the first liquid-crystal board 25.

The low-power-supply driven liquid-crystal adjusting circuit 28 with a configuration described above will now be explained, starting with the common pole COM of the switch SW being connected to the pole P as shown in FIG. 25 and followed with the common pole COM being connected to the other pole Q.

(1) Operation with the common pole COM of the switch SW connected to pole P

Figure 26A:
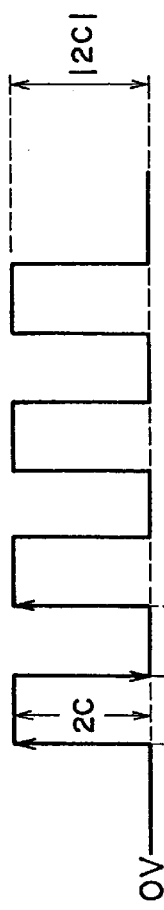
FIGS. 26A to 26D are diagrams showing the timing and the amplitudes of signals generated in the control circuit.
Figure 26B:
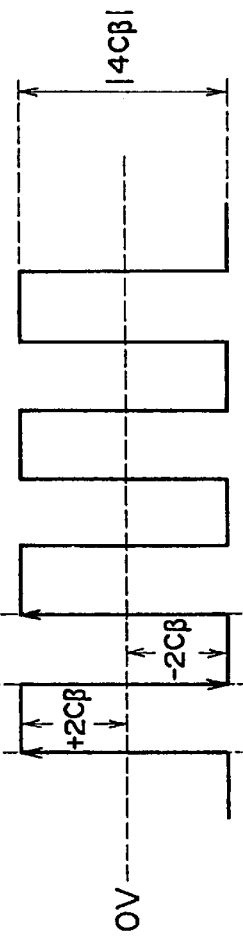

The power-supply voltage VOD having an amplitude 2C shown in FIG. 26A is amplified by the doubling-amplification amplifier AMP1 into a signal with an amplitude of positive $\beta$ times the amplitude 2C, that is, a signal with an amplitude of $+2C\beta$ as shown in FIG. 26B. When the amplitude of the power-supply voltage becomes zero, the doubling-amplification amplifier AMP1 outputs a signal with an amplitude of negative $\beta$ times the amplitude 2C, that is, a signal with an amplitude of $-2C\beta$ as shown also in FIG. 26B. As a result, the amplitude $|2C|$ of the input power-supply voltage VOD is amplified by the doubling-amplification amplifier AMP1 by an amplification degree of $2\times\beta$, giving rise to an output voltage with an amplitude of $|4C\beta|$ supplied to the liquid-crystal display range H/W of is the first liquid-crystal board 25 employed in the liquid-crystal shutter 23 by way of the smoothing capacitor C1.

On the other hand, the amplitude of a signal supplied to the doubling-amplification amplifier AMP2 is reduced to a value determined by the attenuation factor $\alpha$ of the variable resistor VR, resulting in a signal at the output of the doubling-amplification amplifier AMP2 with a different amplitude from that of the signal output from the doubling-amplification amplifier AMP1.

Figure 26C:
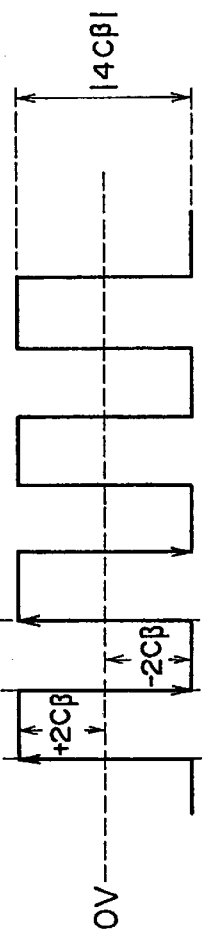

Now, assume that the attenuation factor $\alpha$ is set at 1. In this case, the power-supply voltage VOD with an amplitude 2C shown in FIG. 26A is amplified by the doubling-amplification amplifier AMP2 into a signal with an amplitude of positive $\beta$ times the amplitude 2C, that is, a signal with an amplitude of $+2C\beta$ as shown in FIG. 26C where $\alpha=1$. When the amplitude of the power-supply voltage becomes zero, the doubling-amplification amplifier AMP2 outputs a signal with an amplitude of negative $\beta$ times the amplitude 2C, that is, a signal with an amplitude of $-2C\beta$ as shown also in FIG. 26C where $\alpha=1$. As a result, the amplitude $|2C|$ of the input power-supply voltage VOD is attenuated by the variable resistor VR at an attenuation factor of 1 and then amplified by the doubling-amplification amplifier AMP2 at an amplification degree of $2\times\beta$, giving rise to an output voltage with an amplitude of $|4C\beta|$ supplied to the liquid-crystal display range H/W of the first liquid-crystal board 25 employed in the liquid-crystal shutter 23 by way of the smoothing capacitor C2.

As such, because the attenuation factor a is set at unity ($\alpha=1$), the amplitudes of the signals supplied to the first liquid-crystal board 25 by the doubling-amplification amplifiers AMP1 and AMP2 have the same value $4C\beta$, making it impossible to control the liquid crystal thereof.

Figure 26D:
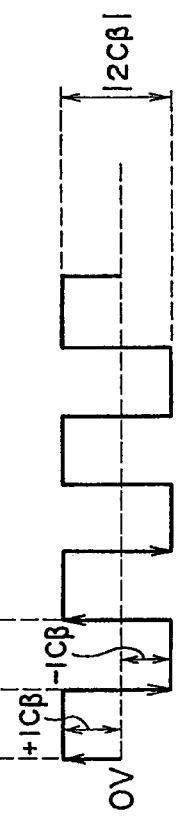

Now, assume that the attenuation factor $\alpha$ is set at ½. In this case, the power-supply voltage VOD with an amplitude 2C shown in FIG. 26A is reduced to a signal with an amplitude 1C before being amplified by the doubling-amplification amplifier AMP2 into a signal with an amplitude positive D times the amplitude 1C, that is, a signal with an amplitude of $+1C\beta$ as shown in FIG. 26D. When the amplitude of the power-supply voltage becomes zero, the doubling-amplification amplifier AMP2 outputs a signal with an amplitude of negative $\beta$ times the amplitude 1C, that is, a signal with an amplitude of $-1C\beta$ as also shown in FIG. 26D. As a result, the amplitude $|2C|$ of the input power-supply voltage VOD is attenuated by the variable resistor VR at an attenuation factor of ½ and then amplified by the doubling-amplification amplifier AMP2 at an amplification degree of $2\times\beta$, giving rise to an output voltage with an amplitude of $|2C\beta|$ supplied to the liquid- crystal display range H/W of the first liquid-crystal board 25 employed in the liquid-crystal shutter 23 by way of the smoothing capacitor C2.

In this way, the amplitude of the signal supplied to the first liquid-crystal board 25 can be changed by properly actuating the switch SW and varying the attenuation factor $\alpha$ of the variable resistor VR. That is to say, by setting the attenuation factor a of the variable resistor VR at a proper value, there is a difference in amplitude between the signals output by the doubling-amplification amplifiers AMP1 and AMP2. With the attenuation factor $\alpha$ of the variable resistor VR set at ½ as described above, for example, the amplitudes of the signals output by the doubling-amplification amplifiers AMP1 and AMP2 are $|4C\beta|$ and $|2C\beta|$ respectively.

As described above, by varying the attenuation factor $\alpha$, half the power-supply voltage VOD can be utilized even if only one power supply is employed. AS a result, two-division control can be carried out on the image display range H/W of the liquid-crystal shutter 23.

(2) Operation with the common pole COM of the switch SW connected to pole Q

In this case, the power-supply voltage VOD shown in FIG. 26A is supplied to the doubling-amplification amplifiers AMP1 and AMP2 without regard to the attenuation factor $\alpha$ of the variable resistor VR. As a result, the signals supplied to the first liquid-crystal board 25 have the same signal, making it impossible to carry out control by using the variable resistor VR, that is, making it impossible to control the liquid crystal in the liquid-crystal display range H/W.

Next, control of the power-supply voltage VOD used in the liquid-crystal shutter 23, in particular, control of the power-supply voltage of the first and second liquid-crystal boards 25 and 26, is explained by referring to FIGS. 27 and 28A–I.

The power-supply voltage VOD used in the liquid-crystal shutter 23 is supplied through a transparent electrode on one side of the second liquid-crystal board 26, an electrode shared with the first liquid-crystal board 25 subject to the two-division driving described earlier. A low-power-supply driven liquid-crystal adjusting circuit 28A, wherein the amplitude of the power-supply voltage required by circuit is reduced by half, is used.

Figure 27:
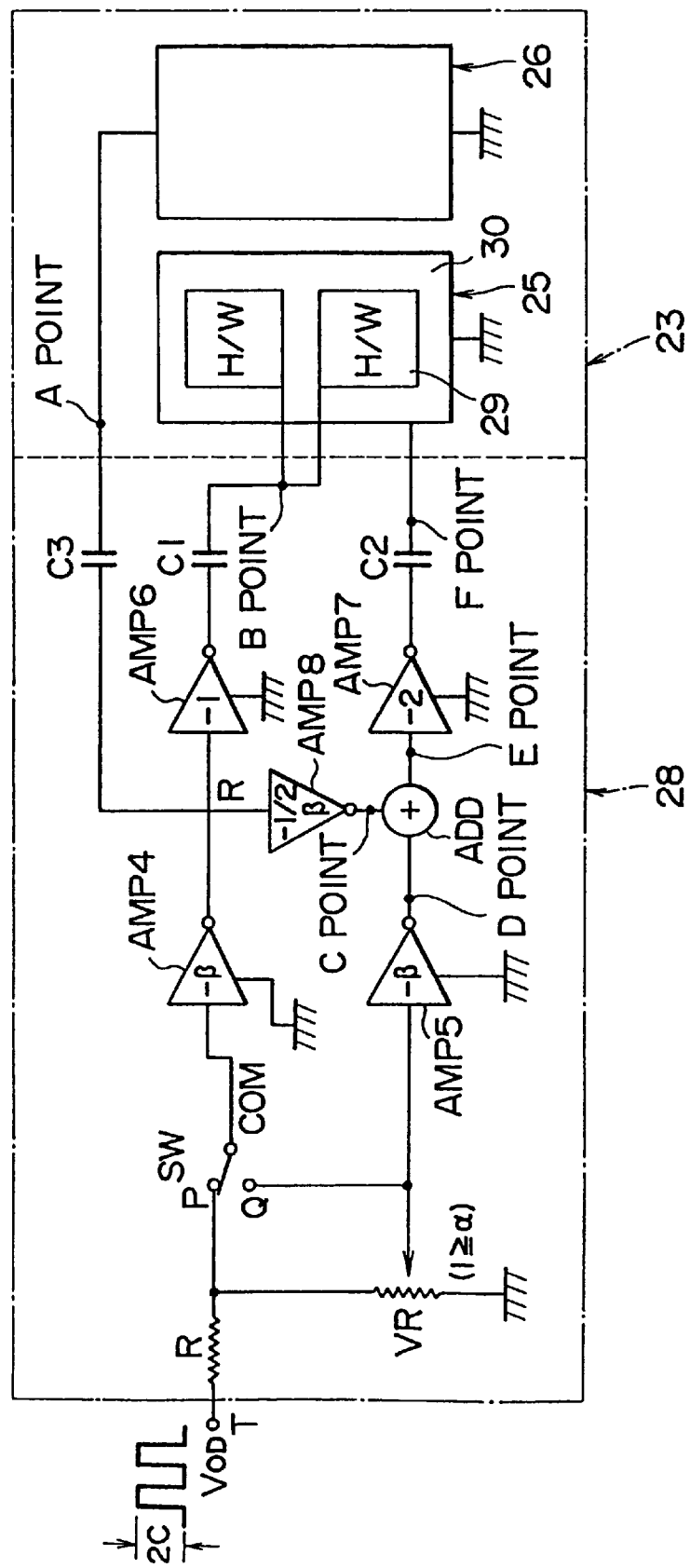
FIG. 27 is a schematic diagram showing another embodiment implementing a control circuit of the liquid-crystal shutter.

FIG. 27 is a diagram showing another embodiment of the low-power-supply driven liquid-crystal adjusting circuit 28A. As shown in the figure, the low-power-supply driven liquid-crystal adjusting circuit 28A includes: (1) a terminal T for inputting a predetermined power-supply voltage VOD with an amplitude 2C; (2) a switch SW with a pole P connected to the terminal T through a series protective resistor R; (3) a variable resistor VR having an attenuation factor α equal to or smaller than 1 with one end connected to an end of the protective resistor R which is connected to the pole P of the switch SW and the other end grounded; (4) a one-time-amplification amplifier AMP4 with the input connected to a common pole COM of the switch SW; (5) a one-time-amplification amplifier AMP5 with the input connected to another pole Q of the switch SW as well as to a sliding terminal of the variable resistor VR; (6) a one-time-amplification-inverting amplifier AMP6 with the input connected to the output of the one-time-amplification amplifier AMP4; (7) a doubling-amplification-inverting amplifier AMP7 with the input connected to the output of the one-time-amplification amplifier AMP5 through an adder ADD;

(8) a half-time-amplification amplifier AMP8 provided between one input of the adder ADD and a connection point between the one-time-amplification amplifier AMP4 and the one-time-amplification-inverting amplifier AMP6; (9) a smoothing capacitor C1 provided between the output of the one-time-amplification-inverting amplifier AMP6 and a shared electrode of the first liquid-crystal board 25; (10) a smoothing capacitor C2 provided between the output of the doubling-amplification-inverting amplifier AMP7 and a common electrode of the first liquid-crystal board 25; and (11) a smoothing capacitor C3 provided between the connection point between the one-time-amplification amplifier AMP4 and the one-time-amplification-inverting amplifier AMP6 and a power-supply electrode of the second liquid-crystal board 26.

The low-power-supply driven liquid-crystal adjusting circuit 28A with a configuration described above will now be explained, starting with the common pole COM of the switch SW being connected to the pole P as shown in FIG. 27 and followed with the common pole COM being connected to the other pole Q.

(1) Operation with the common pole COM of the switch SW connected to the pole P

First, the amplitude of a signal supplied to the shared electrode of the first liquid-crystal board 25 and the amplitude of a signal supplied to the second liquid-crystal board 26 will be explained. Then, the amplitude of a signal supplied to a common electrode of the second liquid-crystal board 26 will be described.

Figure 28:
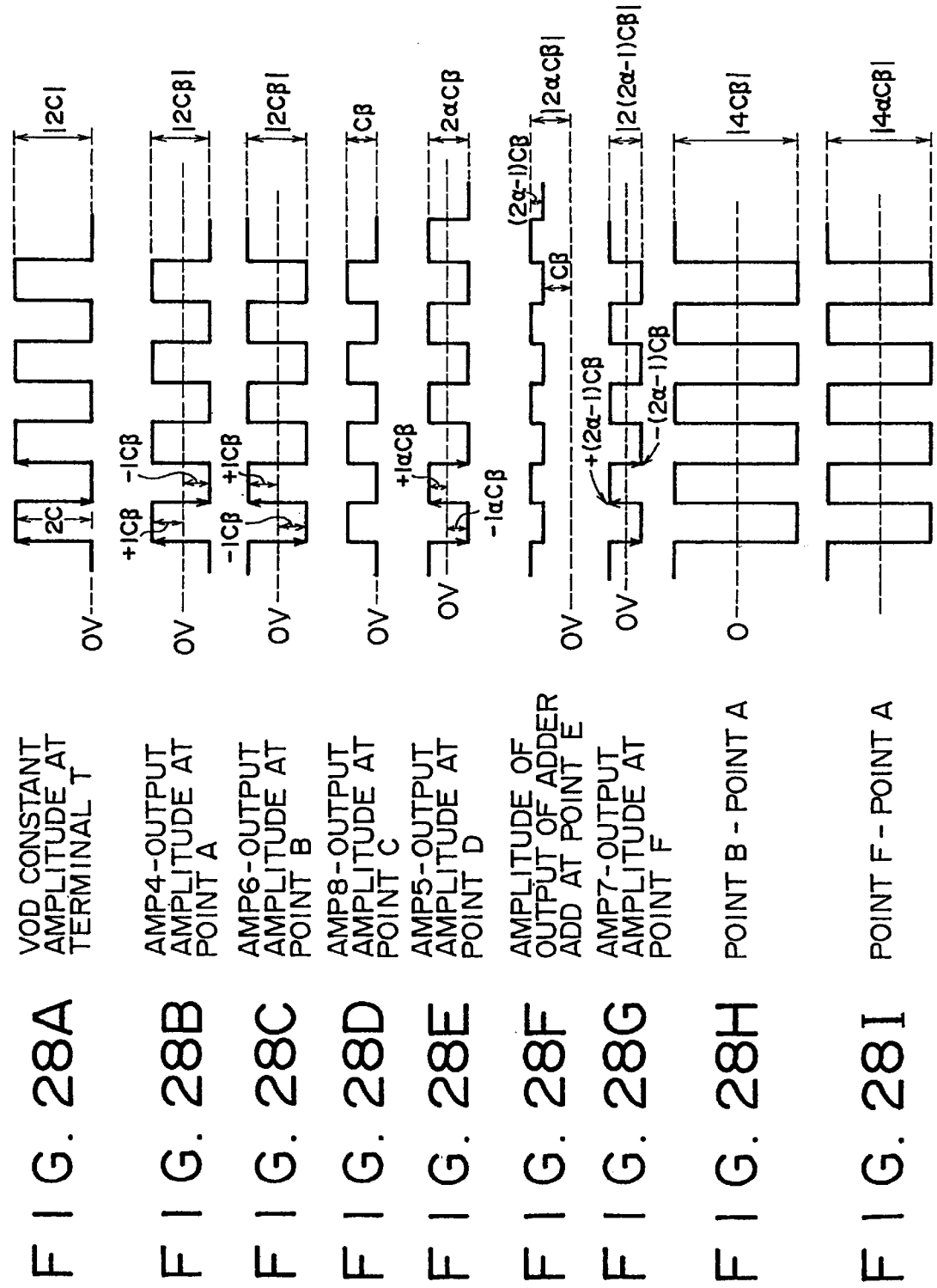
FIGS. 28A to 28I are diagrams showing the timing and the amplitudes of signals generated in the control circuit.
Figure 29:
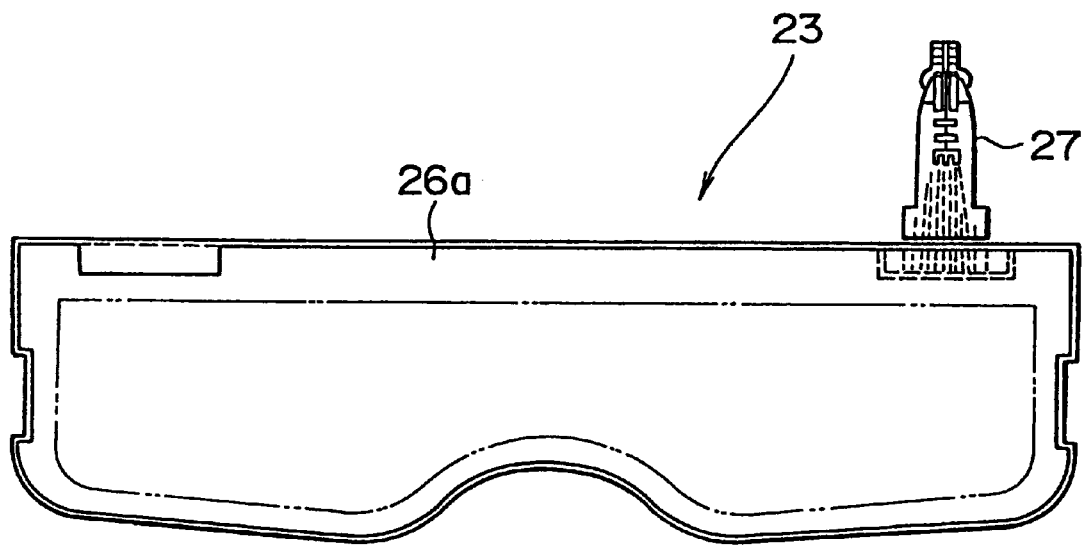
FIG. 29 is a plan view showing a liquid-crystal shutter used in the related art.

The power-supply voltage VOD with an amplitude 2C shown in FIG. 28A is amplified by the one-time-amplification amplifier AMP4 into a signal with an amplitude of positive β times the amplitude 2C, that is, a signal with an amplitude of +1Cβ as shown in FIG. 28B. When the amplitude of the power-supply voltage becomes zero, the one-time-amplification amplifier AMP4 outputs a signal with an amplitude of negative β times the amplitude 2C, that is, a signal with an amplitude of −1Cβ as shown also in FIG. 28B. As a result, the amplitude |2C| of the input power-supply voltage VOD is amplified by the one-time-amplification amplifier AMP4 at an amplification degree of 1×β, giving rise to an output voltage with an amplitude of |2Cβ| supplied to the second liquid-crystal board 26 by way of the smoothing capacitor C3.

The signal amplified by the one-time-amplification amplifier AMP4 at an amplification degree of 1×β is further inverted by the one-time-amplification inverting amplifier AMP6 before being supplied to the shared electrode of the first liquid-crystal board 25 by way of the smoothing capacitor C1 as a voltage with an amplitude of |2Cβ| shown in FIG. 28C.

On the other hand, the amplitude of a signal supplied to the one-time-amplification amplifier AMP5 is reduced to a value determined by the attenuation factor α of the variable resistor VR, resulting in a signal to be supplied to the common electrode of the first liquid-crystal board 25 with a variable amplitude.

Now, assume that the attenuation factor α is set at ½. In this case, the power-supply voltage VOD with an amplitude 20 shown in FIG. 28A is reduced to a signal with an amplitude 1C before being amplified by the one-time-amplification amplifier AMP5 into a signal with an amplitude of positive β times the amplitude 1C, that is, a signal with an amplitude of +(½)Cβ as shown in FIG. 28E where α=½. When the amplitude of the power-supply voltage becomes zero, the one-time-amplification amplifier AMP5 outputs a signal with an amplitude of negative β times the amplitude 10, that is, a signal with an amplitude of −(½)Cβ as shown also in FIG. 28E where (α=½. As a result, the amplitude |2C| of the input power-supply voltage VOD is attenuated by the variable resistor VR at an is attenuation factor of ½ and then amplified by the one-time-amplification amplifier AMP5 at an amplification degree of β, giving rise to an output voltage with an amplitude of |Cβ| as shown in FIG. 28E where (α=½. The signal output by the one-time-amplification amplifier AMP4 is amplified by the half-time-amplification amplifier 8 at an amplification degree of ½ and added to the signal output by the one-time-amplification amplifier AMP5 by the adder ADD. The signal output by the one-time-amplification amplifier AMP4 is amplified by the half-time-amplification amplifier 8 at an amplification degree of ½ in order to prevent the amplitude from exceeding the power-supply voltage VOD.

As shown in FIG. 28F, if the 0 amplitude at a point C at the output of the half-time-amplification amplifier 8 shown in FIG. 28D is brought to the 0 amplitude at a point D at the output of the one-time-amplification amplifier AMP5 shown in FIG. 28E, the amplitudes of the signal output by the adder ADD are from 0 to Cβ and from 0 to (2α−1)Cβ, giving rise to a total amplitude of 2αCβ. The signal output by the adder ADD is supplied to the doubling-amplification-inverting amplifier AMP7 for outputting a signal with an amplitude of 2(2α−1)Cβ with the 0 level taken as a center level as shown in FIG. 28G. The signal is supplied to the common electrode of the first liquid-crystal board 25 by way of the smoothing capacitor C2.

If a difference between the amplitude of the signal supplied to the shared electrode of the second liquid crystal board 26 (that is, the signal at a point B shown in FIG. 28C) and the amplitude of the signal supplied to the second liquid-crystal board 26 (that is, the signal at a point A shown in FIG. 28B) is taken, a signal with an amplitude 4CP is obtained as shown in FIG. 28H. By the same token, if a difference between the amplitude of the signal supplied to the common electrode of the first liquid-crystal board 25 (that is, the signal at a point F shown in FIG. 28G) and the amplitude of the signal at the point A supplied to the second liquid-crystal board 26 is taken, a signal with an amplitude 4αCβ is obtained as shown in FIG. 28I.

What is implied by the description given so far is that, even with the amplitude 2C of a single power-supply voltage VOD, it is possible to obtain a difference in amplitude of 4C for driving the first and second liquid-crystal boards 25 and 26 and, at the same time, by changing the attenuation factor α, driving control of the first liquid-crystal board 25 can be implemented.

(3) Alternative operation with the common pole COM of the switch SW connected to the pole Q In this case, the power-supply voltage VOD shown in FIG. 26A is supplied to the one-time-amplification amplifiers AMP4 and AMPS without regard to the attenuation factor α of the variable resistor VR. As a result, the signals supplied to the first liquid-crystal board 25 have the same amplitude, making it impossible to carry out control by using the variable resistor VR, that is, making it impossible to control the first and second liquid-crystal boards 25 and 26.

As described above, in the optical visualizing apparatus provided by the present invention, when a mute operation is carried out, the image and/or the sound are suspended and, at the same time, the screen can be put in a translucent or transparent state. As a result, the external world can be seen instantaneously even while images are being watched.

Also as described above, the optical visualizing apparatus provided by the present invention allows external scenery to be seen while minimizing interference of an image being displayed on the screen by external light even while the image is being watched. This effect is made possible by dividing the liquid-crystal shutter for controlling infiltration of the inside of the optical visualizing unit by external light beams into an image display range portion of the liquid-crystal shutter and the entire portion of the liquid-crystal shutter. As described above, the liquid-crystal shutter has a shape resembling spectacles and is used for adjusting infiltration by external light beams.

What is claimed is:

1. An optical visualizing apparatus comprising:
    a liquid-crystal display unit for displaying a virtual image generated by reflecting an image from a concave half mirror; and
    a liquid-crystal shutter disposed at an outer side of said concave half mirror for adjusting the amount of external light infiltrating into the apparatus,
    wherein said liquid-crystal shutter has an adjustment means for adjusting the amount of infiltrating external light by dividing a light adjustment area into a first range corresponding to a display region of an image reflected by said concave half mirror and a second range surrounding the display region.

2. The optical visualizing apparatus according to claim 1 wherein the amount of infiltrating external light passing through the first range and the amount of infiltrating external light passing through the second range are adjusted at the same time.

3. The optical visualizing apparatus according to claim 1 wherein the amount of infiltrating external light passing through the first range is shielded while the amount of infiltrating external light passing through the second range is freely adjustable.

4. The optical visualizing apparatus of claim 1, further comprising a suspend means for suspending display of the image in said liquid-crystal display unit.

5. The optical visualizing apparatus of claim 4, wherein said suspend means turns off power to the optical visualizing apparatus after a predetermined time has elapsed.

6. The optical visualizing apparatus of claim 1, wherein the first range has a height H and a width W and the second range has a dimension S, and wherein the liquid-crystal shutter adjusts the amount of infiltrating external light by changing at least one of the height H, the width W, and the dimension S.

7. The optical visualizing apparatus of claim 6, wherein the first range dimensions H and W and the second range dimension S are adjusted independently of each other.

8. The optical visualizing apparatus of claim 6, wherein the first range dimensions H and W and the second range dimension S are adjusted simultaneously.

9. An optical visualizing apparatus comprising:
    a liquid-crystal display unit for displaying a virtual image generated by reflecting an image from a concave half mirror; and
    a liquid-crystal shutter disposed at an outer side of said concave half mirror for adjusting the amount of external light infiltrating into the apparatus,
    wherein said liquid-crystal shutter has a first liquid crystal board for adjusting the amount of infiltrating external light passing through a first range corresponding to a display region of an image reflected by said concave half mirror and a second liquid-crystal board for adjusting the amount of infiltrating external light passing through the first range through a second range surrounding said display region,
    wherein said first and second liquid-crystal boards in said liquid-crystal shutter are driven by a power-supply voltage, and wherein a signal obtained by inverting the amplitude of the power-supply voltage supplied to said first and second liquid-crystal boards is supplied as a common signal.

10. An optical visualizing apparatus according to claim 9 wherein the amount of infiltrating external light passing through the first range and the amount of infiltrating external light passing through the second range are adjusted at the same time.

11. An optical visualizing apparatus according to claim 9 wherein the amount of infiltrating external light passing through the first range is shielded while the amount of infiltrating external light passing through the second range is freely adjustable.

12. The optical visualizing apparatus of claim 9, further comprising a suspend means for suspending display of the image in said liquid-crystal display unit.

13. The optical visualizing apparatus of claim 12, wherein said suspend means turns off power to the optical visualizing apparatus after a predetermined time has elapsed.

* * * * *